US009686275B2

(12) United States Patent
Chari et al.

(10) Patent No.: US 9,686,275 B2
(45) Date of Patent: Jun. 20, 2017

(54) CORRELATING COGNITIVE BIOMETRICS FOR CONTINUOUS IDENTIFY VERIFICATION

(71) Applicant: International Business Machines Corporation, Armonk, NY (US)

(72) Inventors: Suresh N. Chari, Terrytown, NY (US); Pau-Chen Cheng, Yorktown Heights, NY (US); Lawrence Koved, Pleasantville, NY (US); Ian M. Molloy, Chappaqua, NY (US); Youngja Park, Princeton, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

(21) Appl. No.: 14/324,542

(22) Filed: Jul. 7, 2014

(65) Prior Publication Data

US 2016/0006730 A1   Jan. 7, 2016

(51) Int. Cl.
*H04L 29/06* (2006.01)
*G06F 21/32* (2013.01)

(52) U.S. Cl.
CPC .......... *H04L 63/0861* (2013.01); *G06F 21/32* (2013.01); *G06F 2221/2139* (2013.01)

(58) Field of Classification Search
None
See application file for complete search history.

(56) References Cited

U.S. PATENT DOCUMENTS

| 6,256,737 | B1 * | 7/2001 | Bianco | G07C 9/00158 |
| | | | | 713/186 |
| 6,405,318 | B1 * | 6/2002 | Rowland | G06F 21/552 |
| | | | | 726/22 |
| 7,245,218 | B2 | 7/2007 | Ikehara et al. | |
| 8,566,956 | B2 * | 10/2013 | Slater | G06F 21/552 |
| | | | | 707/709 |
| 8,800,056 | B2 * | 8/2014 | Chow | G06F 21/316 |
| | | | | 705/64 |
| 2006/0288234 | A1 | 12/2006 | Azar et al. | |

(Continued)

OTHER PUBLICATIONS

Al-Assam et al., Multi-Factor Biometrics for Authentication: A False Sense of Security, © 2010 ACM, 7 page.*

(Continued)

*Primary Examiner* — Jeffrey Pwu
*Assistant Examiner* — Baotram Tran
(74) *Attorney, Agent, or Firm* — Cantor Colburn LLP; David Quinn

(57) ABSTRACT

A technique is provided for continuous user authentication through real-time fusion and correlation of multiple factors. Monitored data is continuously obtained from a computer. The monitored data is related to user actions on the computer of a user. A server analyzes the monitored data of the computer to execute a windowing system event sequences modality, a network footprint modality, an application specific user actions modality, and/or a forensic linguistic analysis modality for the user. The user is authenticated on the computer based on a combination of the windowing system event sequences modality, the network footprint modality, the application specific user actions modality, and/or the forensic linguistic analysis modality.

19 Claims, 12 Drawing Sheets

(56) References Cited

U.S. PATENT DOCUMENTS

| | | | | |
|---|---|---|---|---|
| 2007/0011039 | A1* | 1/2007 | Oddo | G06F 21/316 705/7.33 |
| 2007/0266257 | A1* | 11/2007 | Camaisa | H04L 63/0838 713/182 |
| 2008/0184349 | A1* | 7/2008 | Ting | H04L 9/3231 726/7 |
| 2010/0030567 | A1* | 2/2010 | Zalewski | G06Q 10/063 705/1.1 |
| 2010/0077484 | A1* | 3/2010 | Paretti | G06F 21/6245 726/26 |
| 2010/0115610 | A1* | 5/2010 | Tredoux | H04L 9/3231 726/19 |
| 2011/0016534 | A1* | 1/2011 | Jakobsson | G06F 21/316 726/28 |
| 2012/0137340 | A1* | 5/2012 | Jakobsson | G06F 21/316 726/1 |
| 2013/0067546 | A1 | 3/2013 | Thavasi et al. | |
| 2013/0067547 | A1* | 3/2013 | Thavasi | G06F 21/32 726/7 |
| 2013/0239191 | A1* | 9/2013 | Bostick | G06F 21/316 726/7 |
| 2013/0239195 | A1* | 9/2013 | Turgeman | G06F 21/316 726/7 |
| 2013/0267204 | A1* | 10/2013 | Schultz | H04W 12/06 455/411 |
| 2013/0305357 | A1* | 11/2013 | Ayyagari | H04L 63/14 726/22 |
| 2013/0343616 | A1* | 12/2013 | Forero | G06K 9/00335 382/115 |
| 2015/0169858 | A1* | 6/2015 | Tg | G06F 21/32 726/18 |
| 2015/0213245 | A1* | 7/2015 | Tartz | G06F 21/83 726/17 |
| 2015/0341350 | A1* | 11/2015 | Mandal | H04L 63/0861 726/6 |

OTHER PUBLICATIONS

Bhargav-Spantzel et al., Privacy Preserving Multi-Factor Authentication with Biometrics, © 2006 ACM, 9 pages.*
Burgbacher et al., A Behavior Biometric Challenge and Response Approach to User Authentication on Smartphones, © 2014 IEEE, 8 pages.*
Chowdhury, Revolution in Authentication Process by Using Biometrics, © 2011 IEEE, 6 pages.*
Malcolm Lear, Stable Metrics in Amorphous Computing: An Application to Validate Operation and Monitor behavior, © 2013 IEEE, 8 pages.*
Lin et al., A Novel Non-Intrusive User Authentication Method based on Touchscreen of Smartphones, © 2013 IEEE, 5 pages.*
Melin et al., Pattern Recognition for Industrial Monitoring and Security using the Fuzzy Sugeno Integral and Modular Neural Networks, © 2007 IEEE, 5 pages.*
Sukarno et al., Increasing Error Tolerance in Biometric Systems, © 2010 ACM, 6 pages.*
D. Blei, et al., "Latent Dirichlet Allocation," Journal of Machine Learning Research, pp. 993-1022, 2003.
O. Brdiczka, et al, "Temporal task footprinting: identifying routine tasks by their temporal patterns," In Proceedings of the 15th International Conference on Intelligent user interfacesm IUI '10, pp. 281-284, New York, NY, USA, 2010. ACM.
S. Card, et al., "The Psychology of Human-Computer Interaction," L. Erlbaum Associates Inc., Hillsdale, NJ, USA, 1983, 13 pages.
A. Hurst, et al., "Automatically Detecting Pointing Performance," In Proceedings of the 13th International Conference on Intelligent User Interfaces, IUI '08, pp. 11-19, New York, NY USA, 2008. ACM.
M. Koppel, et al., "Authorship Attribution in the Wild," Lang. Resour. Eval., 45:83-94, Mar. 2011.
D. Lowd, et al., "Using Salience to Segment Desktop Activity into Projects," In Proceedings of the 14th International Conference on Intelligent User Interfaces, IUI '09, pp. 463-468, New York, NY, USA, 2009.
S. McKeever, et al., "Activity Recognition Using Temporal Evidence Theory," JAISE, 2(3): 253-269, 2010.
I. Molloy, et al., "Evaluating Role Mining Algorithms," In SACMAT '09: Proceedings of the 14th ACM Symposium on Access Control Models and Technologies, 2009. pp. 1-11.
A. Narayanan, et al., "Robust De-Anonymization of Large Sparse Datasets," In IEEE Symposium on Security and Privacy, 2008. pp. 1-15.
A. Newell, "Unified Theories of Cognition," Harvard University Press, Cambridge, MA, USA, 1990. pp. 1-11.
Y. Park, et al., "Hybrid Text Mining for Matching Abbreviations and Their Definitions," in Proceedings of Empirical Methods in Natural Langauge Processings, pp. 126-133, 2001.
Y. Park, et al., "Identification of Probable Real Words: An Entropy-Based Approach," In Proceedings of ACL Workshop on Unsupervised Lexical Acquisition, pp. 1-8, 2002.
Y. Park, et al., "Automatic Glossary Extraction: Beyond Terminology Identification," In Proceedings of the Nineteenth International Conference on Computational Linguistics (COLING 02), pp. 772-778, 2002.
F. Peng, et al., "Language Independent Authorship Attribution Using Character Level Language Models," In Proceedings of the tenth Conference on European Chapter of the Association for Computational Linguistics—vol. 1, EACL '03, pp. 267-274, 2003.
M. Rosen-Zvi, et al., "The Author-Topic Model for Authors and Documents," Proceedings of the 20th Conference on Uncertainty in Artificial Intelligence, pp. 494, 2004. 8 pages.
J- Shen, et al. "Discovering Frequent Work Procedures from Resource Connections," In Proceedings of the 14th International Conference on Intelligent User Interfaces, IUI '09, pp. 277-286, New York, NY, USA, 2009. ACM.
J. Shen, et al., "Real-Time Detection of Task Switches of Desktop Users," In Proceedings of the 20th International Joint Conference on Artifical Intelligence, IJCAI '07, pp. 2868-2873, San Francisco, CA. USA, 2007. Morgan Kaufmann Publishers Inc.
D. Vail, et al., "Conditional Random Fields for Activity Recognition," In Proceedings of the 6th International Joint Conference on Autonomous Agents and Multiagent Systems, AAMAS '07, pp. 235:1-235:8, New York, NY, USA 2007. ACM.
H. Van Halteren, et al., "Linguistic Profiling for Author Recognition and Verification," In Proceedings of the 42nd Annual Meeting on Association for Computational Linguistics, ACL '04, 2004. pp. 1-8.
J. Ward, et al., "Performance Metrics for Activity Recognition," ACM TIST, 2(1):6, 2011; pp. 1-23.
F. Yang, - et al "Context Restoration in Multi-Tasking Dialogue," In Proceeding of the 14th International Conference on Intelligent User Interfaces, IUI '09, pp. 373-378, New York, NY USA 2009 ACM.
J. Yin, et al., "Activity Recognition via User-Trace Segmentation," ACM Transactions on Sensor Networks, vol. 4, No. 4, Article 19, Publication Date Aug. 2008. pp. 1-34.
J. Yin, et al, "Sensor-Based Abnormal Human-Activity Detection," IEEE Transactions on Knowledge and Data Engineering, 20(8), Aug. 2008. pp. 1-24.

* cited by examiner

CORRELATING COGNITIVE BIOMETRICS FOR CONTINUOUS IDENTIFY VERIFICATION

BACKGROUND

The present invention relates to verification, and more specifically, to correlating cognitive biometrics for continuous identity verification.

Biometrics (or biometric authentication) refers to the identification of humans by their characteristics or traits. Biometrics is used in computer science as a form of identification and access control. Biometric identifiers are the distinctive, measurable characteristics used to label and describe individuals. Biometric identifiers are often categorized as physiological versus behavioral characteristics. Physiological characteristics are related to the shape of the body. Examples include, but are not limited to fingerprint, face recognition, DNA, palm print, hand geometry, iris recognition, retina and odor/scent. Behavioral characteristics are related to the pattern of behavior of a person, including but not limited to rhythm, gait, and voice. Some researchers have coined the term behaviometrics to describe the latter class of biometrics.

More traditional means of access control include token-based identification systems, such as a driver's license or passport, and knowledge-based identification systems, such as a password or personal identification number. Since biometric identifiers are unique to individuals, they are more reliable in verifying identity than token and knowledge-based methods.

SUMMARY

According to one embodiment, a method is provided for continuous user authentication through real-time fusion and correlation of multiple factors. The method includes continuously obtaining monitored data from a computer, where the monitored data is related to user actions on the computer of a user, and analyzing, by a server, the monitored data of the computer to execute at least one of a windowing system event sequences modality, a network footprint modality, an application specific user actions modality, and/or a forensic linguistic analysis modality for the user. The method also includes authenticating the user on the computer based on a combination of the at least one of the windowing system event sequences modality, the network footprint modality, the application specific user actions modality, and/or the forensic linguistic analysis modality.

According to one embodiment, a computer program product is provided for continuous user authentication through real-time fusion and correlation of multiple factors. The computer program product includes a computer readable storage medium having program instructions embodied therewith. The program instructions executable by a server to cause the server to perform a method which includes continuously obtaining monitored data from a computer, where the monitored data is related to user actions on the computer of a user, and analyzing, by the server, the monitored data of the computer to execute at least one of a windowing system event sequences modality, a network footprint modality, an application specific user actions modality, and/or a forensic linguistic analysis modality for the user. The method also includes authenticating the user on the computer based on a combination of at least one of the windowing system event sequences modality, the network footprint modality, the application specific user actions modality, and the forensic linguistic analysis modality.

According to one embodiment, an apparatus is provided for continuous user authentication through real-time fusion and correlation of multiple factors. The apparatus includes a processor. The memory include computer-executable instructions that, when executed by the processor, cause the processor to perform operations including continuously obtaining monitored data from a computer, where the monitored data is related to user actions on the computer of a user, and analyzing, by the processor, the monitored data of the computer to execute at least one of a windowing system event sequences modality, a network footprint modality, an application specific user actions modality, and/or a forensic linguistic analysis modality for the user. The method also includes authenticating the user on the computer based on a combination of at least one of the windowing system event sequences modality, the network footprint modality, the application specific user actions modality, and the forensic linguistic analysis modality.

Additional features and advantages are realized through the techniques of the embodiments of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Currently, users are typically authenticated via credentials (e.g., user id and password, biometrics, factor authentication tokens, etc.) to access systems and resources. The problem is that once authenticated, the account or session is authorized for access regardless of who is using the resources (e.g., a computer, phone, tablet, etc.). The real identity of the user is not continuously being verified by the system. The attacker can physically access the computer system (via keyboard, mouse, mobile device, etc.) and/or can access the computer via malware implanted in the computer system.

A methodology for continuous reauthentication of the user is needed to validate that the current user of a computer system and/or resource is who he claims to be. Accordingly, embodiments disclosed herein provide methods for such continuous reauthentication.

Embodiments use (continuous) observations of operating system user interface, such as a windowing system, event sequences, network footprints of user behavior, application specific user operations, and analysis of stylistic linguistic patterns augmented with the process that generates them, to infer models of what tasks the user is performing, the user's expertise in these applications and technologies, as well as the personal idiosyncrasies, style and personal preferences of the user. These models and attributes of the user are comprehensive, and a fusion of biometrics based on these modalities when combined (with state-of-the-art) work on keyboard and mouse movement biometrics yield an accurate fingerprint of the cognitive model of user interaction with the computer.

Figure 1:
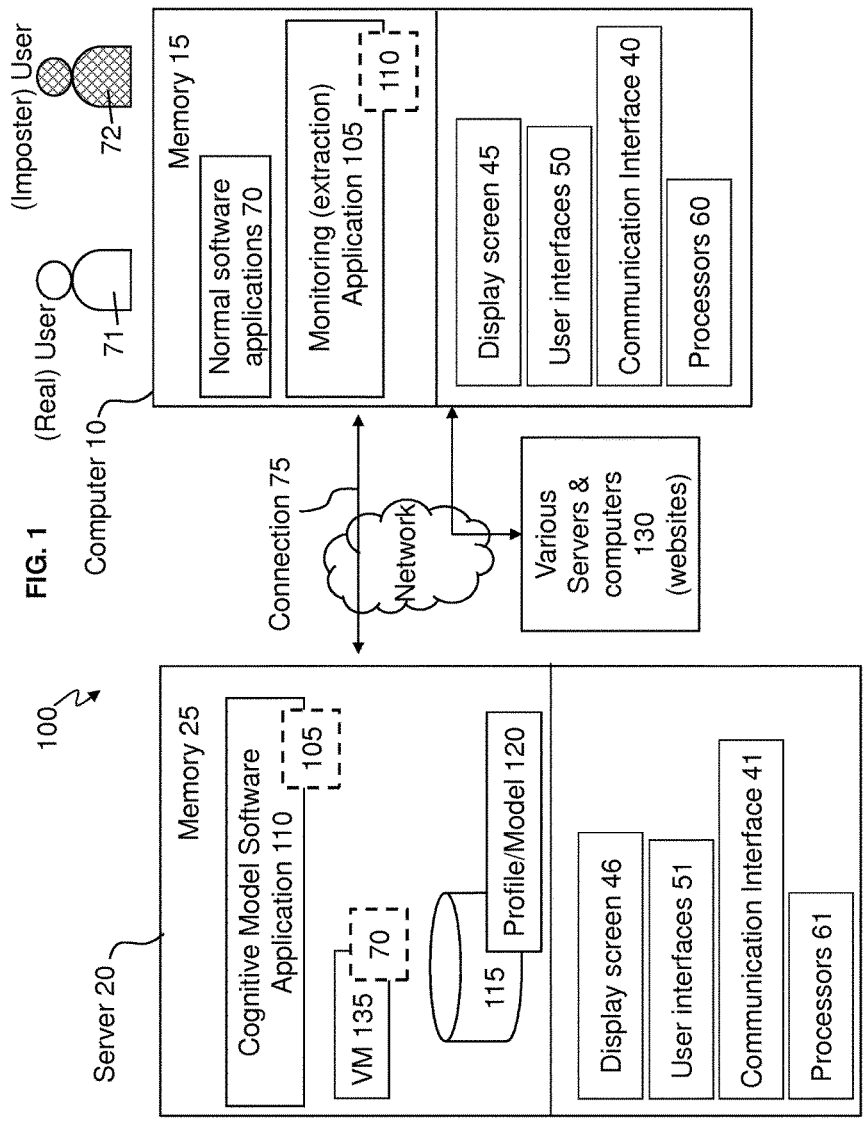
FIG. 1 illustrates an example of an exemplary system according to an embodiment.

FIG. 1 illustrates an example of an exemplary system 100 according to embodiments. The system 100 includes a server 20 operatively connected to a user computer 10 via a connection 75. The connection 75 may be wired or wireless and is operative for communications between the computer 10 and the server 20.

The user computer 10 may be any type of computing device including, for example, laptops, desktops, gaming systems, cellular phones (including smart phones), tablets, etc. Although a single user computer 10 is shown for illustrative purposes, it is understood that there can be numerous user computers 10 (for respective users) that function with the server 20 as discussed herein.

The computer 10 may include and/or be coupled to memory 15 (such as computer readable storage medium), a communication interface 40, display 45, user interfaces 50, and processors 60. The communication interface 40 comprises hardware and software for communicating over a network. The user interfaces 50 may include, e.g., a track ball, mouse, pointing device, keyboard, touch screen, etc. The computer 10 includes normal software applications 70 including the operating system, word processing applications, remote desktop connecting software, media players, gaming software, work specific software applications, web browsing applications, text messaging software, email software (email clients), etc. The memory 15 includes a monitoring software application 105. The monitoring (extraction) software application 105 is configured to continuously monitor data regarding the computer 10 including user actions according to embodiments. Also, the monitoring software application 105 is configured to (continuously) extract the monitored data and (continuously) send the monitored data (push) to the server 20. In one case, the server 20 may (continuously) pull this monitored data from the computer 10. Also, note that monitoring software application 105 can also sit in the computer 10, such that the monitored data does not have to go to a server. Additionally and/or alternatively, the server 20 may be part of the same computer system as the computer 10.

The server 20 includes memory 25 which may be a computer readable storage medium. One or more applications such as a cognitive model software application 110 may be stored on or coupled to the memory 25. The cognitive model software application 110 is configured to build a profile/model 120 of the user. The profile 120 is created based on the monitored data of user interactions on the computer 10, where the monitored data is extracted by the monitoring application 105 and passed to the cognitive model software application 110. The profile 120 of the real user may be stored in a database 115. The profile 120 may include individual models and individual scores respectively generated by the windowing system (operating system) event sequences biometric modality, network footprint of user actions biometric modality, generative models of user operations biometric modality (also referred to as application specific user actions biometric modality), and augmented forensic linguistic analysis biometric modality discussed herein. The server 20 also includes a communication interface 41, display 46, user interfaces 51, and processors 61.

The cognitive model software application 110 and the monitoring software application 105 each comprise logic and software components to operate and function in accordance with embodiments in the form of computer executable instructions.

In one embodiment, the monitoring (extraction) application 105 may be in memory 25 of the server 20. The monitoring application 105 may be integrated with and/or work in conjunction with the cognitive model software application 110. The monitoring (extraction) application 105 can monitor the user actions of the user on the computer 10 via the connection 75 and correspondingly continuously extract the monitored data. The cognitive model software application 110 builds the profile 120 and verifies the user.

In one embodiment, the monitoring (extraction) application 105 may be monitoring one or more virtual machines 135 in and/or connected to memory 25 of the server 20. The virtual machines (VM) 135 may include virtual processors and virtual memory, along with software applications (such as the normal software application 70) running on the virtual machines 135. The computer 10 may be remotely connected to the virtual machines 135. The monitoring (extraction) application 105 can monitor the user actions of the user on the computer 10 being performed on the virtual machines via the connection 75 and correspondingly continuously extract the monitored data of the virtual machine 135 (and computer 10). Accordingly, the cognitive model software application 110 builds the profile 120 and verifies the user.

Figure 2:
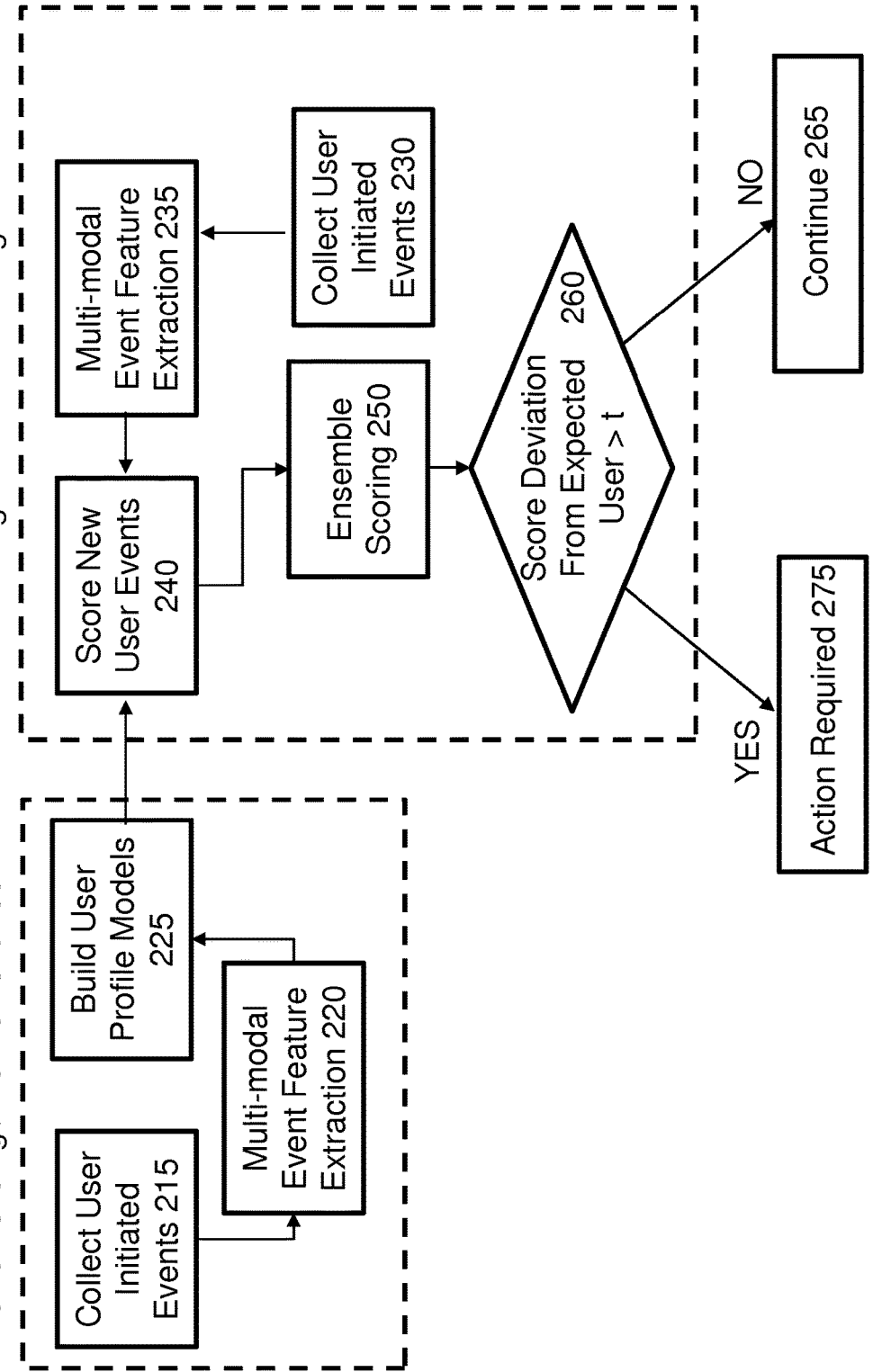
FIG. 2 is a high-level flow diagram of profile building and refinement, along with scoring and authenticating a real user versus an imposter user according to an embodiment.

Now, turning to FIG. 2, a high-level flow diagram 200 of profile building and refinement is provided, along with scoring and authenticating a real user 71 versus an imposter user 72 according to an embodiment. The high-level flow diagram 200 is implemented by the monitoring (extraction) application 105 and the cognitive model software application 110.

The high-level flow diagram 200 includes a profile building and refinement block 205 and a scoring and authenticating block 210.

Initially, the monitoring (extraction) application 105 collects user initiated events (i.e., corresponding to user actions) performed by the real user 71 on the computer 10 at block 215. The monitoring (extraction) application 105 is configured with and utilizes a multi-modal event feature extraction to extract the user initiated events at block 220. This extracted data (which is the monitored data) is sent to the cognitive model software application 110 from the monitoring application 105. The cognitive model software application 110 builds the user profile model 120 for the real user 71 according to the user initiated events (user actions) of the real user 71 at block 225. The user profile model 120 is developed from past behavior of the real user 71 and can be updated over time by the cognitive model software application 110.

The multi-modal event feature extraction block 220 includes four biometric modalities for user verification. The four biometric modalities are windowing system (operating system) event sequences, network footprint of user actions, generative models of use actions (also referred to as application specific user operations modality), and augmented forensic linguistic analysis.

Windowing system (operating system) event sequences biometric modality: humans (i.e., such as the real user 71) accomplish the same goals and tasks using different operations, e.g., to open an application such as Microsoft Word™ by double clicking on a Microsoft Word™ icon on the desktop screen, single clicking an icon on the taskbar or start menu, and/or navigating through the programs menu in the Microsoft Windows™ Start menu. Attributes of the real user 71 such as preferences and expertise, which can be inferred from these operation sequences, are a strong discriminator of how the real user 71 realizes her various goals.

Network footprint of user actions biometric modality: As users (e.g., real user 71) interact with other servers/computer 130 (representing various servers of various websites) and/or invoke specific applications which interact with other servers and computers, there is a large footprint at the network layer such as the distribution of domains, protocols, length and time of communications, etc. The model of this network footprint are a good biometric since the network footprint captures a user's interactions with other servers/computers 130 and reflects specific tasks that the user performs as well as preferences, interests, and/or other likes/dislikes of the real user 71.

Generative models of user operations biometric modality (also referred to as application specific user actions biometric modality): A user's tasks, and hence the operations on software applications (such as anyone of the normal software applications 70) and other resources used to perform these tasks, are dictated in large part by the user's organizational role as well as the user's expertise, preferences, and other such factors. For this biometric modality, the cognitive model software application 110 builds the generative model of the user operations on applications and other resources from training data. The set of applications and other resources, along with the operations that the user currently performs on the applications and other resources are scored against the trained model (i.e., the profile model 120 of the real user 71) to see if the user's roles, tasks, and expertise are consistent with the trained model 120.

Augmented Forensic Linguistic Analysis biometric modality: Another biometric (utilized by the cognitive model software application 110) to explore includes forensic linguistic analysis such as stylometry and the topics of user generated text augmented by the process of user's interaction. The process of user's interaction to be analyzed results in text that has editing operations, idiosyncratic slips and errors, as well as text with a context, e.g., application, recipient of the email, etc., in which the text was generated.

In the profile building and refinement block 205, the cognitive model software application 110 is configured to create a separate score for each of the four biometric modalities (of multi-modal event feature extraction), such that each biometric modality has its own score according to respective user initiated events for the real user 71. For example, to be stored in the profile 120 for the real user 71, the cognitive model software application 110 determines an individual score (and/or model) for windowing system (operating system) event sequences biometric modality, an individual score (and/or model) for generative models of user operations biometric modality (application specific user actions biometric modality), an individual score (and/or model) for network footprint of user actions biometric modality, and an individual score (and/or model) for augmented forensic linguistic analysis biometric modality (each of which is stored in the profile 120 for the real user 71 a priori). Subsequently, the same process is later repeated for the present user on the computer 10, and the cognitive model software application 110 needs to determine/verify whether the present user is the real user 71 or an imposter user 72 (anyone who is not the real user 71). Accordingly, the cognitive model software application 110 obtains presently monitored data for the present user on the computer 10 and generates the four individual scores (for the windowing (operating system) event sequences biometric modality, generative models of user operations biometric modality, network footprint of user actions biometric modality, and augmented forensic linguistic analysis biometric modality) for the present user. In one embodiment, each individual new score for the present user is compared (for the same biometric modality on a one-to-one basis) to the previously stored individual scores for the real user 71, and the cognitive model software application 110 determines the present user is (in fact) the real user 71 when each new individual score does not deviate its previously individual score (respectively) by more than a predefined amount. Otherwise, the cognitive model software application 110 determines that the present user in the imposter user 72. The above authentication utilized the individual scores separately to authenticate the present user, but the individual scores of the four biometric modalities may be combined as discussed further below.

Referring back to FIG. 2, the cognitive model software application 110 is configured to combine the four individual scores using, e.g., logistic regression, support vector machine, etc., to obtain an ensemble score for the real user 71 according to an embodiment. In the database 115, the four scores for the four biometric modalities are stored in the profile model 120 for the real user 71, along with the ensemble score (i.e., combined scores) of the four biometric modalities for the real user 71. The profile model 120 has been created and stored for the real user 71 in the past. The profile model 120 may include many models of the user's actions based on the biometric modalities discussed herein. The profile model 120 can be updated through time as the real user 71 learns more operations on the computer 10. Individual scores may be combined using an aggregation function, such as sum, max, and/or weighting individual components.

After the profile model 120 has been initially created for the real user 71, the high-level flow diagram 200 proceeds to the scoring and authenticating block 210. The scoring and authenticating block 210 occurs for the present/current time that the present user is utilizing the computer 10 in order to score and authenticate the present user (which may be the real user 71 and/or could be the imposter user 72). During the present time (i.e., in real-time), a present user is performing user actions on the computer 10 and the cognitive model software application 110 needs to determine whether the present user is the real user 71 who has authority to use the computer 10 or whether the present user is the imposter user 72 who is unauthorized to utilize the computer 10. The cognitive model software application 110 utilizes the previously created profile model 120 for the real user 71 to verify when the real user 71 is using her computer 10 and when the real user 71 is not the user on her computer 10 (e.g., the imposter user 72 is unauthorized using the computer 10 and posing as the real user 71).

In the scoring and authenticating block 210, the monitoring (extraction) application 105 collects the user initiated events (i.e., corresponding to user actions) performed by the present user on the computer 10 at block 230. The monitoring (extraction) application 105 utilizes the multi-modal event feature extraction to extract the user initiated events at block 235. Note that block 230 performs the same as earlier block 215 and that block 235 performs the same as earlier block 220.

At block 240, the cognitive model software application 110 is configured to create a separate/individual score for each of the four biometric modalities (of multi-modal event feature extraction) according to the user initiated events (i.e., user actions) of the present/new user (as discussed above). After having an individual score for windowing (operating system) event sequences, network footprint of user actions, generative models of use actions, and augmented forensic linguistic analysis according to the user initiated events of the present user, the cognitive model software application 110 is configured to combine the four individual scores to obtain a present (new) ensemble score for the present user at block 250. Since the four scores for the four biometric modalities were previously stored in the profile model 120 for the real user 71, along with the (past) ensemble score of the four biometric modalities for the real user 71, the cognitive model software application 110 has the past ensemble score (for the real user 71) which is the expected ensemble score and the present ensemble score for the present user (who awaits verification as the real user 71 or the imposter user 72). The cognitive model software application 110 compares the past ensemble score (i.e., expected score previously determined for the real user 71) with the present (new) ensemble score of the present user, and determines whether the present ensemble score of the present user deviates from the past ensemble score of the real user 71 by more than an amount "t", at block 260. The deviation amount t is a predefined difference in the value of past ensemble score previously stored in the profile model 120 (for the real user 71) versus the present ensemble score of the present user.

When the present ensemble score of the present user deviates from the past ensemble score of the real user 71 by less than the deviation amount t, the cognitive model software application 110 determines/authenticates that the present user is in fact the real user 71, and cognitive model software application 110 allows the real user 71 to continue working on the computer 10 at block 265. However, when the present ensemble score of the present user deviates from the past ensemble score of the real user 71 by more than the deviation amount t, the cognitive model software application 110 determines that the present user is the imposter user 72, and the cognitive model software application 110 blocks the imposter user 72 from working on the computer 10 at block 275. The present user 275 may be required to pass further verification.

The cognitive model software application 110 is configured to use observed behavior (of the user) to infer user action models, user behavior, user intent and/or other user attributes. Further, embodiments use observations of operating system (windowing system) event sequences, network footprints of user behavior, application specific user behavior and analysis of stylistic linguistic patterns augmented with the processes that generate them, to infer models of what tasks the user is performing (which may arise from the user's role in an organization), the user's expertise with these applications and technologies, as well as personal idiosyncrasies, style and personal preferences. These models and attributes of the user are comprehensive. Embodiments utilize a fusion of biometrics (i.e., combined score) based on these modalities, when combined with keyboard and mouse movement biometrics, in order to yield an accurate cognitive fingerprint of the user's interaction with a system (such as the computer 10). In other words, a function of the cognitive model software application 110 is that no two users should have precisely the same ensemble of attributes; accordingly, the cognitive model software application 110 can quickly verify whether the claimed user (who claims to be real user 71) is presently using the computer 10 or whether the imposter user 71 is utilizing the computer 10.

The cognitive model software application 110 may include features of popular models of computer-human interaction including GOMS (Goals, Operators, Methods and Selection rules) (Stuart K. Card, Allen Newell, and Thomas P. Moran, *The Psychology of Human-Computer Interaction*. L. Erlbaum Associates Inc., Hillsdale, N.J., USA, 1983.); ACTR (Allen Newell. *Unified theories of cognition*. Harvard University Press, Cambridge, Mass., USA, 1990.); and Activity Recognition (Jamie A. Ward, Paul Lukowicz, and Hans-Werner Gellersen. *Performance metrics for activity recognition*. ACM TIST, 2(1):6, 2011.), all of which are incorporated herein by reference.

According to embodiments, the cognitive model software application 110 is configured to view the user as starting with a set of goals and interaction tasks/activities. These can result from the user's organizational role (e.g., manager, administrative office assistant, engineer, receptionist, etc.) and/or expertise with using the applications at their fingertips and personal preferences. Starting with a high level goal, the user considers the various sequences (the methods and selection rules) of elementary operators (e.g., programs) and chooses one or more of these possibilities. The choices that the user makes again reflect the same attributes such as expertise, personal idiosyncrasies, style, and/or preferences. The cognitive model software application 110 observes user activity at various levels of the system (e.g., computer 10). The sequences of operators that the user chooses often directly correspond to sequences of events at the operating system (windowing system/desktop) level (e.g., application invocation, application termination, opening a file, editing operations). Similarly, invoking certain operators of the application results in the application contacting other servers or computers (represented as various servers and computers 130) often leaving behind a large (network) footprint at the network level. Finally, once the user interacts with applications, the cognitive model software application 110 has artifacts such as linguistic fragments and other attributes of how various pieces of text were produced by the user. These linguistic fragments and other attributes of how various pieces of text were produced by the user may include keystrokes indicative of editing operations, idiosyncratic slips and errors as well as the context, e.g., frequently misspelled words and subsequent corrections application, recipient of the email, etc. The cognitive model software application 110 uses this data to infer enough unique attributes of the user in order to perform identity verification.

Embodiments define a syntropic profile (such as the profile 120 of the real user 71) to be the creation of a "cognitive fingerprint" of the real user 71 performing a series of tasks that are consistent with her job and job role. If one were to be randomly observing a user, one would see a largely undifferentiated stream of keystrokes and mousing events that would be difficult to correlate with system and network-level events. But in reality, the events are well coordinated in order to achieve higher-level goals related to their job and personal interests as determined by the cognitive model software application 110.

While a GOMS model does not enable building of a syntropic profile of the user, it does provide a high level organizational structure for analysis of user behaviors. The cognitive model software application 110 may use a GOMS-like model as a high level organization template. Embodiments transform sequences of low-level biomechanical operations into a series of selection rules, methods, and operators. Some of the biomechanical operations (selection rules, methods, and operators) have secondary effects, such as generating network traffic. The cognitive model software application 110 applies different modeling techniques to identify the unique characteristics of the selection rules, methods, operators, and network activity, which then generate a cognitive fingerprint of a user (such as the profile 120 of the real user 71). This cognitive fingerprint in the profile 120 accurately verifies the identity of real user 71 in an operating system environment such as a traditional Microsoft Windows™ based environment. Although examples using Microsoft™ products are provided for explanation purposes and ease of understanding, it is understood that embodiments are not limited by such examples.

The following example illustrates a scenario on computer 10. An analyst (job function) receives an email in an email software, such as Microsoft Outlook™ (Outlook™), indicating that the scope of an existing mission has been expanded. The analyst is responsible for updating a spreadsheet, such as a Microsoft Excel™ spreadsheet (Excel™), connected to a remote structured query language (SQL) database, to indicate the additional costs associated with updated mission. In addition, a slide presentation software, such as Microsoft PowerPoint™ presentation, on the cost impact of the mission needs to be updated. The monthly status report may be amended using a text/word processing software, such as Microsoft Word™. To achieve the analyst's goals, a number of instant messages (IMs) are exchanged with colleagues. During the time that this activity is taking place, the analyst may receive several Outlook™ messages unrelated to current assignments, and several IMs of a personal nature (e.g., lunch invitation). Thousands of digital artifacts are created at the operating system (including windowing), network and application layers, along with linguistic artifacts; all of which are created in order to reach the goals via a set of operations, methods, and selection rules. The cognitive model software application 110 turns these artifacts into a syntropic profile (i.e., profile 120).

Figure 3:
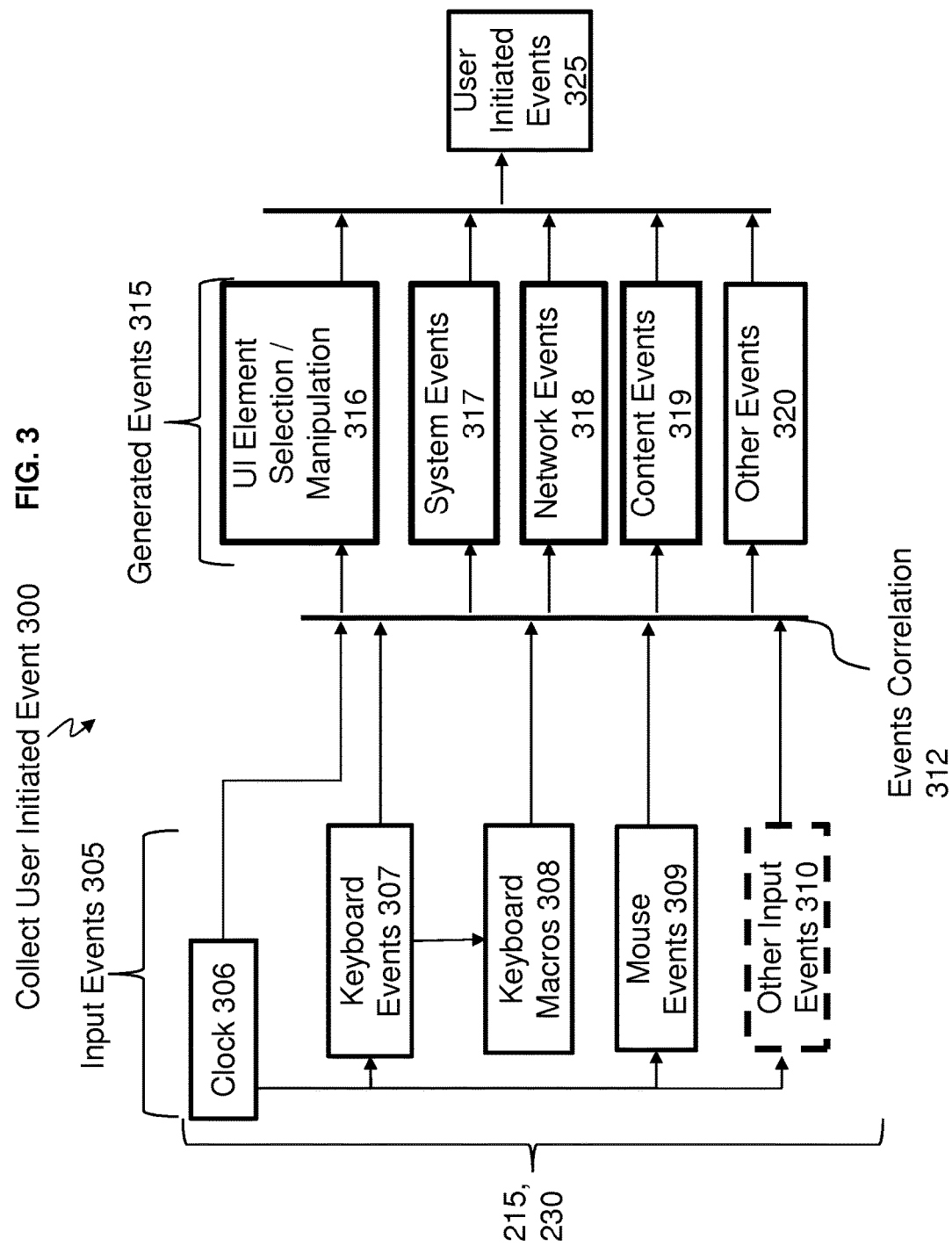
FIG. 3 is a flow diagram illustrating further details of the collecting user initiated events biometric modality according to an embodiment.

Now turning to FIG. 3, FIG. 3 is a flow diagram 300 illustrating further details of collecting user initiated events of the block 215, 230 by the monitoring (extraction) application 105 (which are used by the cognitive model software application 110) according to an embodiment. In the flow diagram 300, input events 305 on the computer 10 are monitored and collected by the monitoring (extraction) application 105. The input events 305 include collecting timing of the clock 306 (of the computer 10), keyboard events 307, mouse events 309, and other input events 310. The timing of the clock 306 (on computer 10) is collected for each user initiated event and/or sequence of user initiated events. Keyboard events 307 are the events that the user typed on the keyboard (i.e., user interface 50) connected to the computer 10. Keyboard events 307 include keyboard macros 308, and a keyboard macro 308 is a command defined to stand for another sequence of keys. For example, simultaneously pressing the control key and the "s" key is a keyboard macro for saving the current document displayed on the display screen 45. Mouse events 309 are any functions performed by the user manipulating (such as selecting, highlighting, scrolling, resizing, etc.) the mouse (i.e., user interface 50) operatively connected to the computer 10. Other inputs events 310 include touch screen events such as the touching the touch screen (i.e., display screen 45) to manipulate the computer 10.

After receiving the various input events 305, the cognitive model software application 110 performs events correlation 312 to correlate the input events 305 into generated events 315. After the events correlation, the generated events 315 include user interface (UI) element selection/manipulation 316, system events 317, network events 318, content events 319, and other events 320. The generated events 315 are all designated as user initiated events 325.

The user interface (UI) element selection/manipulation 316 corresponds to any type of selection and/or manipulation performed by the user. The system events 317 are calls to the operating system functions from the applications. The network events 318 are any type of communication wired and wireless (e.g., via the communication interface) by the computer 10 outside of the computer 10 such as over the network. The network events 318 may be communications with the various servers and computer 130. The content events 319 include what content such as applications that the user is selecting. The other events 320 include other application calls to the operating system and/or other applications and services installed on the computer 10 through an (application programming interface) API.

The cognitive model software application 110 includes activity recognition (AR), which looks to identify and discriminate between specific activities within a stream of events from sensors. AR has been applied to a number of domains, including identifying activities in the home, multi-agents activities, and computer desktops. Input sensor data has included keyboard, mouse, video, audio and mobile devices. Within the cognitive model software application 110, supervised and unsupervised machine learning techniques can be employed, including a variety of Hidden Markov Models algorithms, Conditional Random Fields, Bayesian networks, among others. While AR is looking for recognition of the occurrence (and/or absence) of specific activities, embodiments additionally look for the user's natural and idiosyncratic variations that within and between activities. Being able to segment a stream of low-level events into discrete or parallel activities is utilized in classifying events by the particular activity/role in which the user is engaged. In turn, this enables the cognitive model software application 110 to select the most appropriate model/template to which the user's input events should be matched. For example, a syntropic model for writing a meeting invitation versus a model for a writing document evaluating the effectiveness of a project. In each of these documents, the content, and therefore aspects of the language being used, may differ somewhat; the cognitive model software application 110 selects the best model according to the activity performed by the user.

Figure 4:
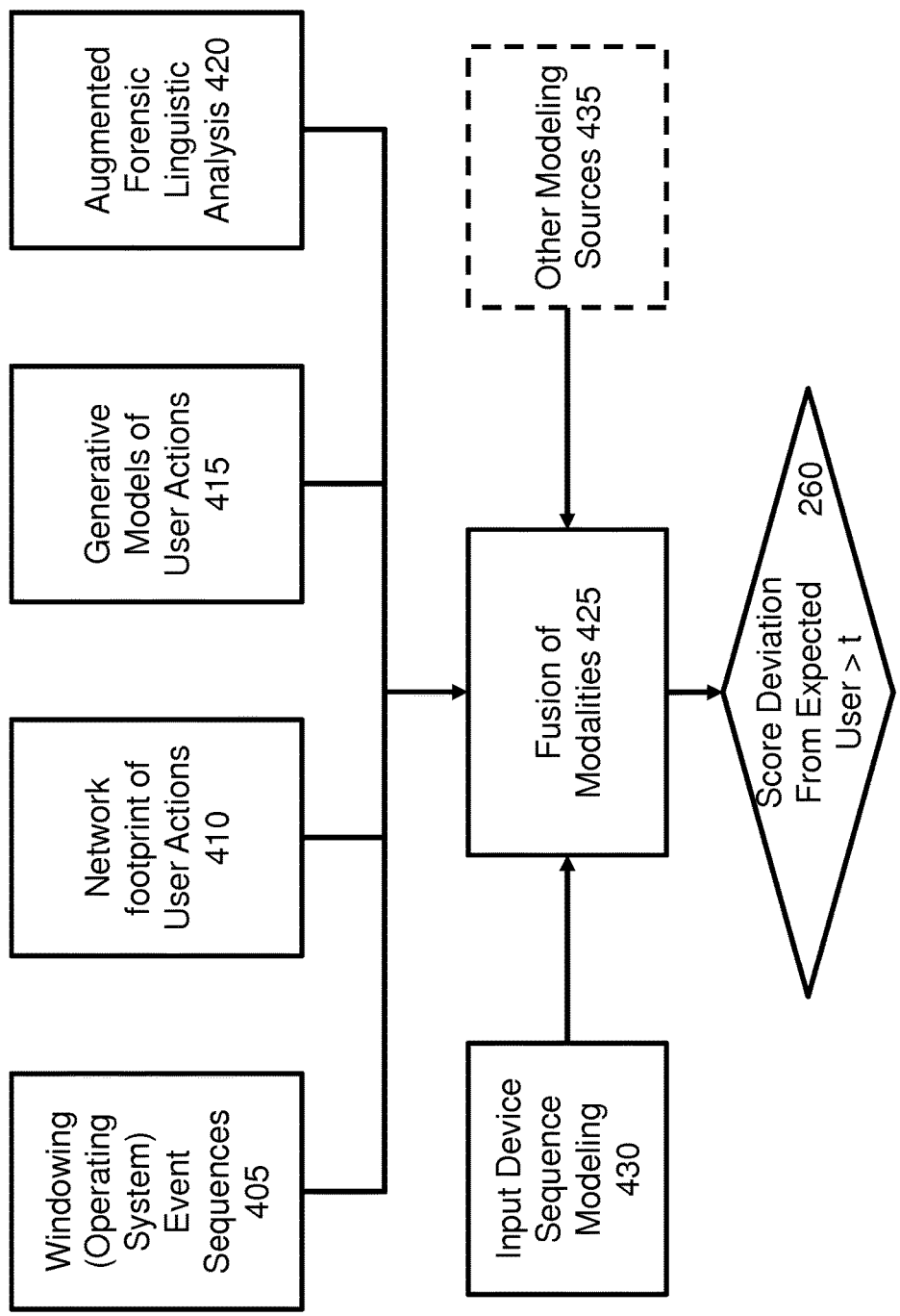
FIG. 4 is a flow diagram illustrating further details of the multi-modal event feature extraction according to an embodiment.

FIG. 4 is a flow diagram 400 illustrating further details of the multi-modal event feature extraction at block 220, 235 according to an embodiment. The flow diagram 400 is executed by the cognitive model software application 110. The flow diagram 400 includes the four biometric modalities which are windowing (operating system) event sequences at block 405, network footprint of user actions at block 410, generative models of user actions at block 415, and augmented forensic linguistic analysis at block 420, which are fused together into a fusion of modalities (e.g., the four individual scores of the biometric modalities are combined) at block 425. Input device sequence modeling 430 and other modeling sources 435 are also fused into the fusion of modalities block 425. As noted above (for both the real user 71 (initially) and subsequently the present user (which may or may not be the real user 71), the cognitive model software application 110 determines an individual score for each of the four biometric modalities in blocks 405, 410, 415, 420, and then uses the individual scores to calculate an ensemble score. The previous/past ensemble score (stored in the profile model 120) of the real user 71 is compared against the present ensemble score of the present user to determine whether the present ensemble score deviates from the previous ensemble score by more than the deviation amount t.

Figure 5:
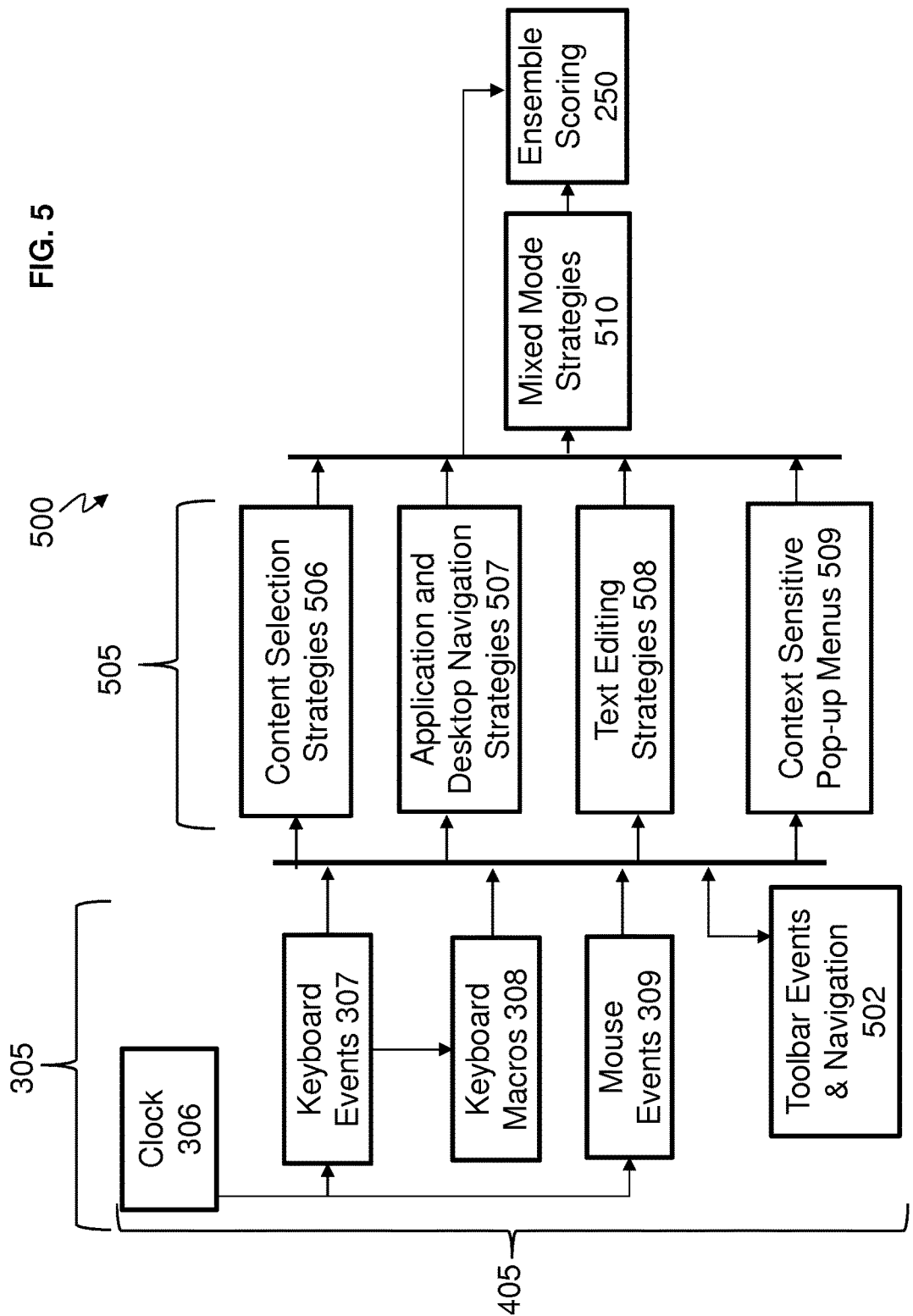
FIG. 5 is a flow diagram illustrating further details of the windowing system (operating system) event sequences biometric modality according to an embodiment.

Turning to the windowing event sequences more in depth, FIG. 5 is a flow diagram 500 illustrating further details of the windowing (operating system) event sequences biometric modality at block 405 according to an embodiment. As discussed herein, the windowing event sequences are one of the biometric modalities executed by the cognitive model software application 110.

The windowing event sequences modality extracts and analyzes the monitored data related to a windowing system (or window system), which is a type of graphical user interface (GUI) that implements the WIMP (windows, icons, menus, pointer) paradigm for a user interface. In a windowing system, each currently running application is assigned a usually resizeable and usually rectangular shaped surface of the entire screen to present its graphical user interface to the user. Usually a window decoration is drawn around each window. The programming of both, the window decoration and of available widgets inside of the window (these are graphical elements for direct user interaction, such as sliders, buttons, etc.), is eased and simplified through the use of widget toolkits. The idea behind any of the available desktop (operating system) environments is to use the same widget toolkit for all clients, and to create and groom icon sets and themes to achieve a consistent "look and feel" for at least the main programs, such as the file browser.

The block 405 for the windowing event sequences has the input events 305 which include timing of the clock 306, keyboard events 307, keyboard macros 308, mouse events 308, and toolbar and navigation events 502. The toolbar and navigation events 502 include entering a key selection on the keyboard instead of entering the same selection with the mouse.

The cognitive model software application 110 receives the input events 305 and performs categorization of the user's behavior in the input events at block 505. The categorization of the user's behavior includes content selection strategies 506, application and desktop navigation strategies 507, text editing strategies 508, and context sensitive pop-up menus strategies 509. An example of a content selection strategy 506 is the user navigating a text area in a text editor and selecting the text via holding down the shift key while holding down the shift and control keys and then pressing the left or right arrow keys to highlight the text to be selected. Alternatively and/or additionally, there are mouse operations that can perform the same text selection operation.

An application and desktop navigation strategy 507 may include using a mouse to navigate and select amongst active applications and/or using the alt-Tab key combination to navigate amongst the currently running applications (e.g., on the computer 10). Text editing strategies 508 may use the same techniques as navigating a text area and selecting text as well as the use of the backspace and delete keys. Context sensitive menus 509 may use the mouse and/or keystroke sequences to navigate the context menus and make desired selections. Each of these strategies 505 can be used to at least partially identify a user.

The cognitive model software application 110 calculates a score for the user's behavior (e.g., real user 71) based on how the user interacted with the computer 10 according to the content selection strategies 506, application and desktop navigation strategies 507, text editing strategies 508, and context sensitive pop-up menus 509. The cognitive model software application 110 calculates this score for the biometric modality of the windowing (operating system) event sequences, and this score is passed to the ensemble scoring at block 250. In some cases, the score for the windowing event sequences may include mixed mode strategies 510. The cognitive model software application 110 is configured to determine that the user is utilizing mixed mode strategies when the user's behavior to perform a single task (or the same task) incorporates two or more of the content selection strategies 506, application and desktop navigation strategies 507, text editing strategies 508, and context sensitive pop-up menus 509.

The cognitive model software application 110 is configured to store the input events and process the user's actions for each input event. For example, the most general features of interest (that a monitored and categorized/determined by cognitive model software application 110) are derived from windowing system events, including keyboard and mouse events, toolbar access (determines whether the user utilizes keyboard macros versus mouse versus mixed strategies), context sensitive pop-up menus (e.g., determines whether the user utilizes a right click with or without object selection), text edit strategies (determines whether the user utilizes menu-based editing, keyboard shortcuts, a keyboard and mouse combo, mouse-centric), navigation techniques (determine whether the user utilizes keyboard, keyboard shortcuts, mouse, combinations of these) for specific functionality and/or applications, content selection techniques (determines whether the user utilizes single content selection, multiple content selection, mouse, keyboard, some combination of these), timing for these operation combinations, sequences for new file creation and file deletion.

Within each application, such as Windows Explorer™ and the Microsoft Office™ suite of applications, there are a large number of windowing system interaction techniques that are turned into application-specific features of the cognitive model software application 110. To further discriminate users, the features also include timing information via the clock 306. As factored into the profile 120 created for the user (real user 71), the rate at which some of these windowing operations can be performed helps to discriminate users by level of proficiency with an application as well as their manual dexterity.

Note that the cognitive model software application 110 may incorporate or integrate several machine learning techniques to build models of users through windowing system interactions. The most popular techniques used for activity recognition (AR) include Hidden Markov Models (HMMs) and Hierarchical HMMs. The cognitive model software application 110 is configured to look at the probability that specific paths and/or operations are performed within each application and/or within a context in the application on the computer 10. For example, a model in the cognitive model software application 110 can identify the frequency of using "expert" sequences of right mousing on an object and selecting an operation on that object and/or the frequency of a mouse selecting an object and then using a keystroke to complete an operation rather than right mousing to perform the operation or using the toolbar menu to perform the operation. The cognitive model software application 110 captures and utilizes this monitored data for user verification.

Users interact with the computer windowing systems in unique ways that distinguish them from other users. Based on roles within the organization, goals, available software tools, training, experience, and expertise, a user creates a digital fingerprint of how they interact with windowing system artifacts, including window manipulation, menu access and navigation, application launch sequence, etc.

The following is an example scenario of the cognitive model software application 110 applying the windowing (operating system) event sequences biometric modality. In the context of Microsoft Windows™ (or another windowing based operating environment), user level activities most often result in the initiation of programs (methods) and interaction within these programs (operators). For example, a user has a goal of creating and sending a written document to a colleague. The user first interacts with Windows™ Explorer (including the "desktop") to start Microsoft™ Word™, creates the document, and then saves the document. Then Microsoft Outlook™ is started, the email is addressed to the recipient, a message is composed via the keyboard, the document is attached in the email, and the email with the attached document is sent by the user. The fingerprint (analyzed and created by the cognitive model software application 110) is of the sequences of windowing (and operating system) operations within these programs to achieve the goal.

User operations are performed to achieve the goal of sending a document to a colleague. Since there is more than one possible sequence of operations to achieve a goal, the user relies on prior knowledge and preference for performing the method of performing the tasks, e.g., starting Word™. Possible operations include the user double clicking on a Word™ icon on the desktop, single clicking an icon on the taskbar, clicking on the Start icon menu, and/or selecting and navigating through the programs menu in the Start menu. These interactions to start Word™ can be done via the mouse, keyboard and/or a combination of both. Similarly, termination of Word™ can be done via a variety of techniques, including the application menu bar, a combination of keystrokes, and/or mouse interaction with the window frame/title bar. Within this range of options, there are multiple variations as well. The set of selection rules by the cognitive model software application 110 (which may represent a GOMS model) applied over a range of operations/tasks result in a fingerprint of the user's interaction (for real user 71 (stored in profile 120) to be compared against any current user) with the windowing system. While a user may not always perform the operations in the same sequence every time, people are creatures of habit and tend to use learned patterns that are comfortable and/or meet a performance objective. As the number of possible ways (selection rules) in which the user can achieve his goal increases, there is increase in probability that the fingerprint is unique for the user.

The cognitive model software application 110 can use activity recognition systems that use windowing events to build, identify, and discriminate user activity. Embodiments modify activity recognition to identify the features (interaction style) that uniquely characterize a user. Windowing systems and applications have a broad range of operations, including multiple selection rules (sequences of windowing operations), that can be used to reach goals and sub-goals. It is the unique sequences of selection rules analyzed by the cognitive model software application 110 (e.g., over GOMS) over operators and methods that uniquely characterize a user (i.e., the real user 71).

Although embodiments are not limited to any one specific way or ways to score the windowing events, one approach is to collect windowing events during a training period, construct one or more models, as previously described, and then use the models for scoring. If more than one model is used, a fusion model can be applied to combine the scores. For example, the cognitive model software application 100 may use a weighted sum proportional to the accuracy of the models based on the features selected.

Figure 6:
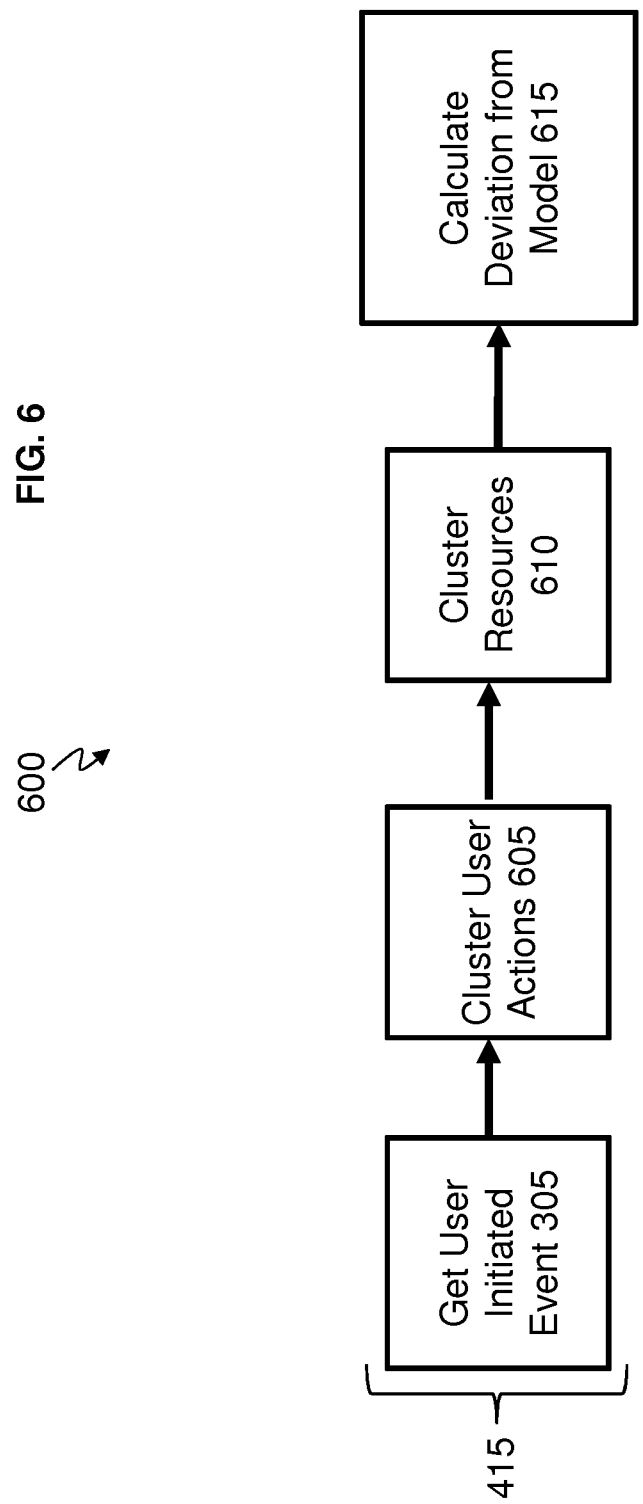
FIG. 6 is a high-level diagram illustrating further details of the generative models of user action biometric modality according to an embodiment.

Turning to the generative models of user actions (also referred to as application specific user operations) more in depth, FIG. 6 is a high-level diagram 600 illustrating further details of the generative models of user action biometric modality at block 415 according to an embodiment. The diagram 600 is executed by the cognitive model software application 110 (after receiving the monitored data from the monitoring application 105).

At block 305 (as discussed in FIG. 3), the cognitive model software application 110 obtains the user initiated events. At block 605, the cognitive model software application 110 clusters each of the user actions per resource (such as per file that is obtained and/or for a particular software application being accessed). For each user initiated event, the cognitive model software application 110 clusters the resources accessed and/or obtained at block 610. The cognitive model software application 110 parses the various resources (including applications) that the user is accessing.

After having previously created the profile 120, the cognitive model software application 110 is configured to determine how much the choices of the present user actions (which could be for the real user 71 and/or the imposter user 72) for each resource and the selection of particular resources deviate from the profile model 120 previously stored for the real user 71. When the score of the present user deviates from the stored score in the profile 120 for the real user 71 by more than the predefined deviation amount, the cognitive model software application 110 determines that the present user is an imposter. Otherwise, when the present score deviates less than the predefined deviation amount, the cognitive model software application 110 authenticates the present user on the computer 10 as the real user 71.

Figure 7:
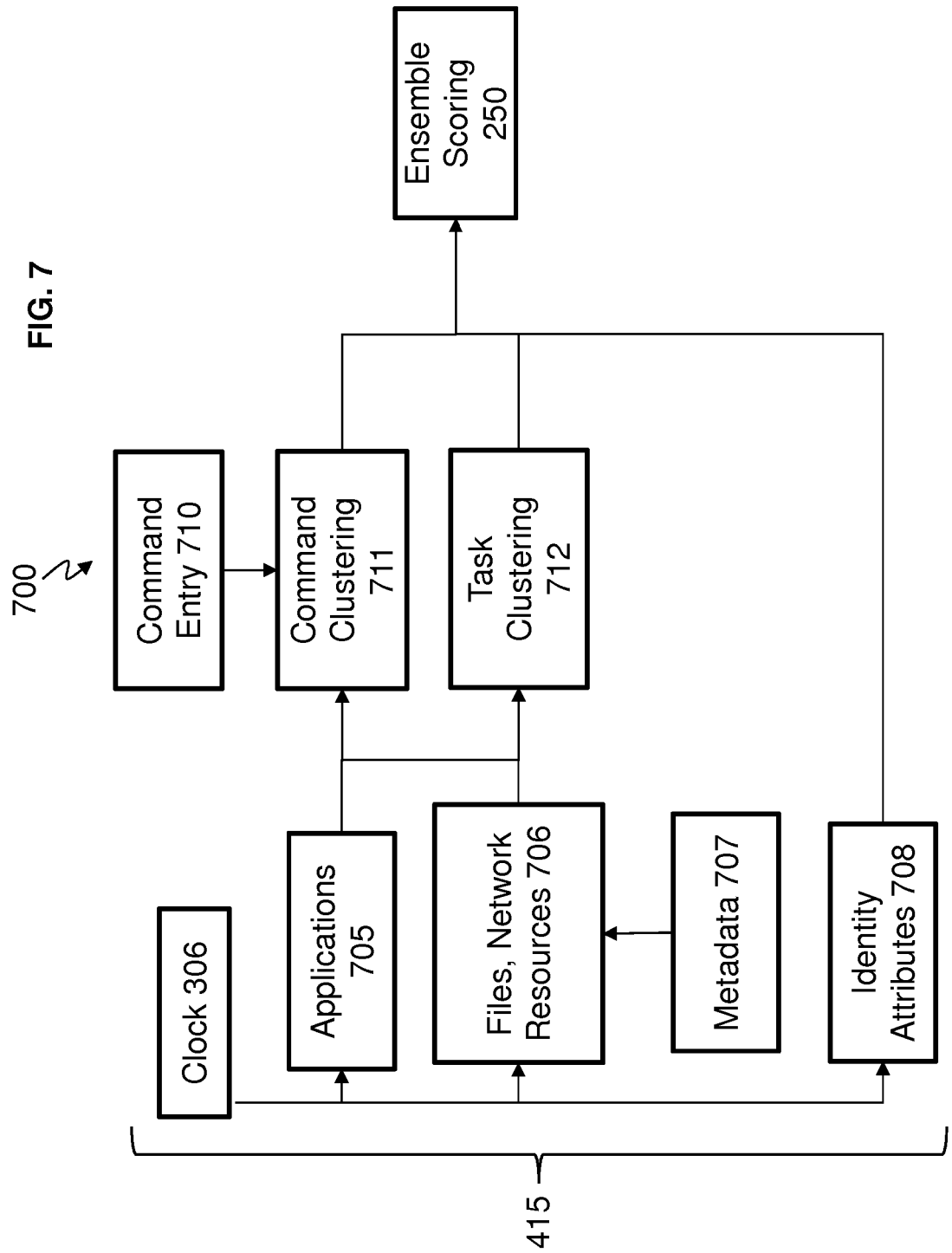
FIG. 7 is a flow chart illustrating further details of the generative models of user actions biometric modality according to an embodiment.

FIG. 7 is a flow chart 700 illustrating further details of the generative models of user actions biometric modality at block 415 according to an embodiment.

The block 415 for the generative models of user actions factors in the timing of the clock 306, identification/listings of accessed applications block 705, files and network resources block 706, and metadata associated with the files and network resources block 707, and identity attributes block 708. The identity attributes 708 include the identity of the user, such as the job description and job tittle.

The cognitive model software application 110 tracks (determines) the command entries 710 of commands input with regard to the applications block 705 and files and network resources block 706. The cognitive model software application 110 clusters the commands input by the user for the particular application and resource at block 711. At block 712, the cognitive model software application 110 clusters the different task performed by the user.

The cognitive model software application 110 calculates a score for the generative models of user actions based on how specific clusters of commands used for particular applications and resources and based on the type of tasks the user is attempting to perform, along with the identity attributes of the user (is the user working on resources that coincide with her job description). The cognitive model software application 110 calculates a score for the biometric modality of the generative models of the user actions, and this score is passed to the ensemble scoring at block 250.

For example, the cognitive model software application 110 prepares a generative model of the user's (generated) operations as digital manifestations of the cognitive goals and operations the user (e.g., real user 71) performs. The digital manifestations of the cognitive goals and operations are exhibited (and generated) by the resources (such as files stored in memory (e.g., memory 15 and/or virtual machine 135), software applications, etc.) accessed, the methods and modes for which the resources are accessed, and the applications the user chooses to perform these operations. As such, the cognitive model software application 110 is configured to fingerprint the user (real user 71) through his choice in operations to perform, thus identifying the roles in which the user is acting in each context.

There are multiple levels of granularity at which such user fingerprinting and role identification tasks can be performed. At a coarse grained level (or higher level), the cognitive model software application 110 can measure the applications used. For example, the cognitive model software application 110 measures the amount of time the user spends in each application, the number operations the user performs in each application, and frequency of (each of the) operations the user performs in each application. For example, some users primarily edit documents in Word™, while other read PDFs in Adobe™ Acrobat™ software. Also, some users manipulate spreadsheets in Excel™, and browse the web in Internet Explorer™, while other users utilize other software applications. The choice of each application depends on the user's current cognitive tasks (being performed on the computer 10). The cognitive model software application 110 utilizes these choices of the user (e.g., real user 71) to create the profile 120, and based on the profile 120, the cognitive model software application 110 determines when the imposter user's choices (imposter user 72 improperly using the computer 10) deviate from the profile 120 created for the real user 71 by the predefined deviation amount.

Similarly, the cognitive model software application 110 observes the documents and other resources the user accesses. These include the Microsoft™ Office documents in the examples above, but also basic text files, databases, images and videos, remote servers, etc. These resources can often be assigned attributes explicitly, through keywords, tags, and/or other metadata, and/or assigned attributes implicitly through the file-system hierarchy. For example, all files located in the same directory are implicitly related in the same way, and the name of the directories leading to the root of the file system provides semantic information about the files, such as projects, components, owners, and/or types. The assignment of attributes may be used to cluster certain resources into accounts or case files by the cognitive model software application 110, and the cognitive model software application 110 utilizes these key attributes to provide strong indications of the current user tasks.

At finer levels of granularity, the cognitive model software application 110 measure what the users do in each application on the given resources, including the features, commands, and functions executed. In a Word™ document, certain features, such as the ability to produce a table of contents, cross reference sections, and/or insert keyed references, depends on the task and skill level and training of the user, as recognized by the cognitive model software application 110. As software becomes increasingly more powerful, the cognitive model software application 110 is configured to recognize that a user's skill level and work requirements (only) necessitate a small subset of the total features, resulting in a large, sparse relationship between application features, and the users that understand and leverage those features. At this level, the cognitive model software application 110 is configured to measure the time taken by the user execute each application command and measure the frequency the user performs each application command.

Further, in each application, the cognitive model software application 110 measures how the user invokes each command. Increasingly more complex software introduces more ways to leverage each feature. Modern applications, such as the Microsoft™ Office Suite, contain hierarchical menus, toolbars, keyboard shortcuts, contextual menus from right clicking, and context specific toolbars that appear and disappear given the current context, such as mouse position or cursor selection. The methods by which each user leverages the abilities of the applications is utilized by the cognitive model software application 110 as an indication of the expertise and familiarity as discussed above, such that the cognitive model software application 110 can distinguish between the real user 71 (having her profile model 120 previously stored) and the imposter user 72 (who is determined by application 110 to have a different expertise and familiarity).

Given the wealth of information obtained from user actions, the cognitive model software application 110 may apply three classes of machine learning and clustering algorithms. The cognitive model software application 110 may include and/or incorporate features of role mining, where role mining may be an effective tool for identifying common roles and/or tasks that each user performs. This is useful for identifying tasks that are common to many users. However, to distinguish the unique expertise of a particular user for identity verification, the cognitive model software application 110 may include the features in the long tail may be utilized, and further information may be found in *Robust De-Anonymization of Large Sparse Datasets*, by Arvind Narayanan and Vitaly Shmatikov, in IEEE Symposium on Security and Privacy, 2008, which is herein incorporated by reference.

The cognitive model software application 110 may include and/or incorporate features of generative models. Unlike most role mining techniques, generative models seek to explain how an observed set of operations was produced.

Various generative models in the cognitive model software application 110 can be utilized for effectively determining the current cognitive task of the user. Such models can be conditioned on the current context and/or features of the users and resources, including human resource (HR) attributes and resource types, document location, etc.

Information on generative models may be found in "Generative Models for Access Control Policies: Applications to Role Mining Over Logs with Attribution" by Ian Molloy, Youngja Park, and Suresh Chari, in SACMAT '12: Proceedings of the 17th ACM symposium on Access control models and technologies, 2012, which is herein incorporated by reference.

Further, partially observable Markov models and granger models can identify patterns in the order and frequency of user operations, which may be included in and/or incorporated in the cognitive model software application 110. When considering the Word™ example above, some users may write a full draft of their documents first, and later add cross references, produce a table of contents, and apply styles to note section divisions (perhaps the users did not know about the features a priori), while other users may prefer to perform these operations inline. Similarly, when composing an email, some users may type the subject and body before including a set of recipients to prevent accidentally sending an unfinished draft. These two examples represent personal preferences and expertise in the features of each application and the cognitive model software application 110 is configured to utilize these differences to distinguish the real user 71 from the imposter user 72.

In the above three instances, the cognitive model software application 110 build models of the user's manifested operations and identify latent features of the user's current task and expertise, e.g., in the profile 120. When presented with a new stream of user events from the present user utilizing the computer 10, the cognitive model software application 110 measures the probability that data was generated from the learned model (stored in the profile 120), and/or the probability the data may have originated from another model (which means that the present user's actions do not fit the previously stored real user's action as created in the profile 120).

For example, many user task models produce a probability distribution the user is attempting to complete a given cognitive task. When the cognitive model software application 110 generate two models, the learned model (stored in the profile 120) and a model trained on the new data that is for the present user, the cognitive model software application 110 measure how much these models differ, e.g., using Kullback-Liebler divergence, and the sequence of operations that would require them to converge, a deviation of the Earth mover's distance.

Given the increasing complexity of modern feature-rich software, the cognitive model software application 110 expects to extract sparse and long tailed distributions features from the user's behavior as she interacts with applications and resources. Such distributions provide ample entropy to identify users in large datasets. However, not all applications are equally complex, and not all user populations are sufficiently diverse. For example, software applications like PowerPoint™ and Excel™ are likely to yield more statistically significant features than more simple applications, such as Internet Explorer™, where the complexity is often transitioned away from the web browser, and into the web applications (e.g., JavaScript). Therefore, the cognitive model software application 110 measures the entropy of operations in each application.

Further, many user populations may be rote in their operations. Assume that there is a call-center style application. Users may initially lookup a user account, using a small number of variables (e.g., telephone number and mailing address), perform a small number of operations (e.g., check a balance and submit a payment), and commit (store) the results. Large populations of users that perform tasks with little variation may yield little entropy for user identification verification as long as the impersonating user is performing the same tasks with the same level of proficiency. In these instances, the cognitive model software application 110 can rely more on (i.e., add more weight to) the personal preferences and other windowing features to aid in the verification tasks of the real user 71 versus the imposter user 72.

Once a generative model (a set of related probability distributions) has been built for user, new actions may be scored (by the cognitive model software application 110). To score new activity, user actions are fit against the existing generative model, producing as output one or more probabilities. The deviation of the obtained probabilities from the expected probabilities is computed and used for a score. Deviation can be calculated by comparing to one or more expected probabilities, such as those obtained from the training period. A measure of distance, such as Kullback Leibler divergence, can be used to compute pairwise deviation scores. Further, a measure of significance can be obtained by comparing the probabilities from the distribution of probabilities obtained in the training period. For example, highly volatile users will naturally have higher deviation scores, and should be considered normal.

Figure 8:
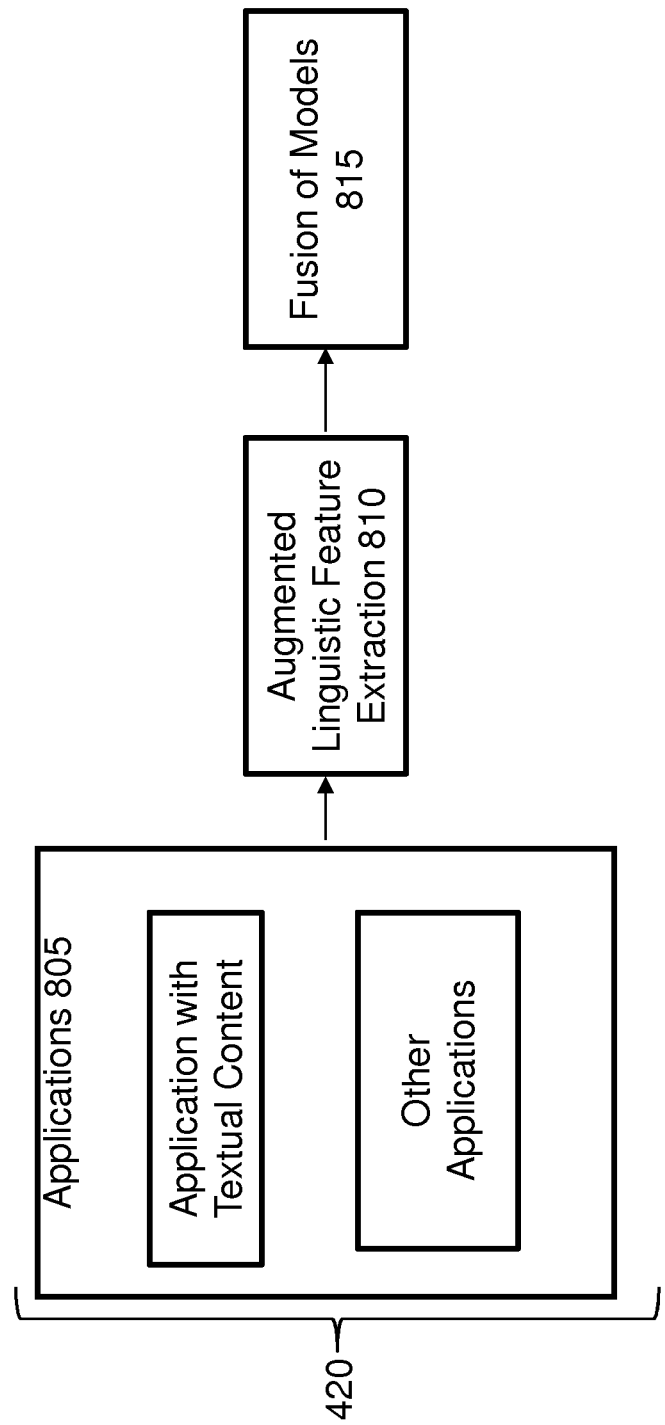
FIG. 8 is a high-level diagram illustrating further details of the augmented forensic linguistic analysis biometric modality according to an embodiment.

Turning to the augmented forensic linguistic analysis modality more in depth, as executed by cognitive model software application 110, FIG. 8 is a high-level diagram 800 illustrating further details of the augmented forensic linguistic analysis biometric modality at block 420 according to an embodiment. The high-level diagram 800 of the augmented forensic linguistic analysis include applications block 805. The applications block 805 includes application with textual content and other applications. The applications block 805 flows into augmented linguistic feature extraction block 810 which extracts all of the linguistic features for analysis. At block 815, the cognitive model software application 110 fuses the models utilized to perform the linguistic analysis in order to generate a score for the augmented forensic linguistic analysis of the user.

Figure 9:
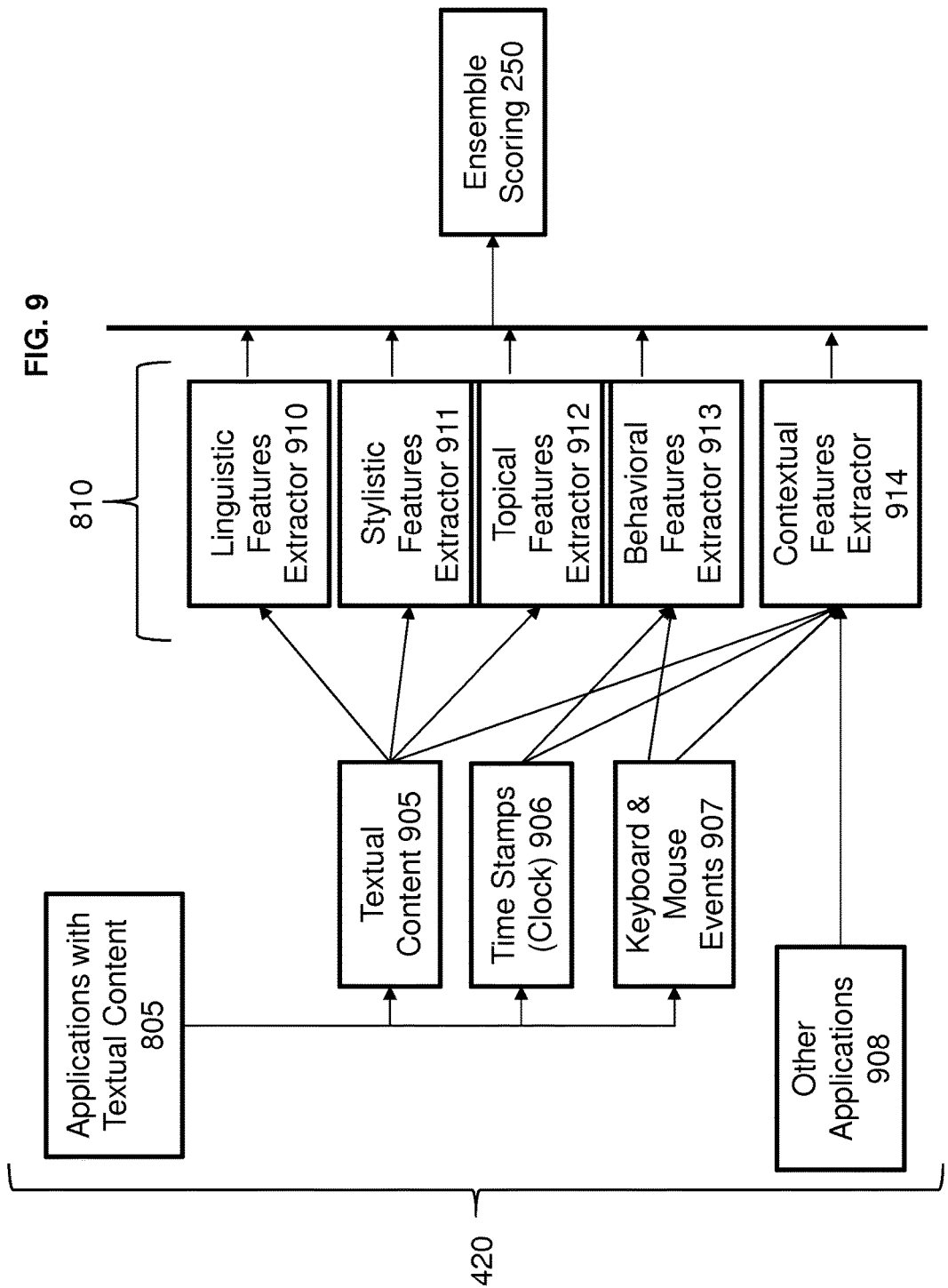
FIG. 9 is a flow chart illustrating further details of the augmented linguistic feature extraction biometric modality according to an embodiment.

FIG. 9 is a flow chart 900 illustrating further details of the augmented linguistic feature extraction biometric modality at block 420 according to an embodiment. As noted above, the cognitive model software application 110 receives input from and analyzes the applications block 805 with textual content. Within the application with textual content, the cognitive model software application 110 analyzes textual content 905, time stamps (from the clock) 906, and keyboard and mouse events 907. The cognitive model software application 110 also includes input from other applications at block 908. The cognitive model software application 110 is configured to analyze and extract the type of augmented linguistic features using a linguistic features extractor 910 that extracts/analyzes linguistic information, a stylistic features extractor 911 that extracts/analyzes stylistic information, a topical features extractor 912 that extracts/analyzes topic type information of the input text, a behavioral features extractor 913 that extracts/analyzes behavioral information related to the text generation, and a contextual features extractor 914 extracts/analyzes the contextual information in the application block 805 with textual information. The cognitive model software application 110 combines this information to determine a score for the augmented linguistic feature extraction block 420 for the user (e.g., real user 71) and stores this score in the profile 120.

The augmented linguistic biometric modality 420 determines a score based on the augmented linguistic features by comparing the features extracted from the current event and the features in the user's models. During a training time, a user's linguistic events (i.e., applications with textual content) are collected and the linguistic features are extracted by the feature extractors described in FIG. 9. A model is built using the features extracted from the training samples (via cognitive model software application 110). For a new event, the features extracted from the new event are compared with the model, and a score representing how similar or distant the new event is from the model is computed (via cognitive model software application 110). The individual score augmented linguistic feature extraction block 420 is combined (e.g., using weights) with the individual scores for the windowing event sequences block 405, the network footprint of user actions block 410, and the generative models of use actions block 415 at the ensemble scoring block 250.

For explanation purposes, an example scenario of the augmented forensic linguistic analysis in the cognitive model software application 110 is provided below. Most actions of a user at the computer 10 involve language use, such as generating and reading emails, generating and reading reports, and generating and reading source code. Linguists have long believed that individual people have distinctive ways of writing and speaking (i.e., idiolect), and these idiosyncratic attributes can be used to distinguish an individual from others. Recently, there has been increasing adoption of authorship attribution and forensic linguistics for intelligence, criminal investigation, and plagiarism detection.

The state-of-the art techniques used in automatic authorship attribution and forensic linguistics rely on linguistic characteristics at every level (lexical, syntactic, and stylistic) and apply a classification tool to determine the author from multiple candidate authors. While these approaches have shown promising results, there are several drawbacks in the direct application of these technologies to active authentication.

First, one needs a substantial amount of labeled data (e.g., documents written by the target author, and optionally, by other authors) to train a classifier. However, many computer users do not produce a large number of documents but use computers for shopping or social networking. In these situations, the state-of-the-art system may not obtain enough training data resulting in very poor system accuracy. Second, in active authentication scenarios, the target text can often be very short such as one line of chat or email messages. A statistical analysis of these short texts will be unreliable in the state-of-the-art system. Third, the documents exhibit a high degree of stylistic and linguistic variations depending on the applications. For instance, the language patterns in email messages and in business documents are very different. Furthermore, people often apply different linguistic styles in different contexts. For instance, people tend to use more formal and grammatical language when they write to their superordinate (i.e., superiors) and/or multiple recipients. Especially, if the training documents are different from the target document, these linguistic and stylistic analysis will fail to identify the author in state-of-the-art techniques. Lastly, existing techniques rely only on the final form of the written document.

However, for active authentication according to embodiments, the cognitive model software application 110 is configured to exploit not only the written document in final form but the entire process of text creation for the written document (prior to final form) and the context where the text is being created for the written document. For instance, people make similar typos due to their typing habits and/or their incorrect knowledge of the word, especially when the author is not a native speaker. These mistakes are typically made unconsciously, and, therefore, are good indicators for the authorship as it can be determined by the cognitive model software application 110 to recognize the real user 71 from the imposter user 72. These mistakes are not available in the final form of the write document (i.e., final document), as most mistakes are corrected during the writing time. Accordingly, the cognitive model software application 110 enhances forensic linguistics in two directions. First, the cognitive model software application 110 is configured to exploit additional behavioral and contextual features as well as linguistic and stylistic features for active authentication. Active authentication is the process of authenticating the author as the author is creating (i.e., typing) a document from the very beginning through the end (which is the final form of the written document). Second, the cognitive model software application 110 is configured to apply advanced machine learning to more accurately capture fine-grained knowledge on the user and the user's evolving linguistic behaviors. Specifically, the cognitive model software application 110 is configured can apply multi-view learning algorithms and on-line learning approaches.

Table 1 shows representative features for the various feature categories of blocks 910, 911, 912, 913, and 914. The cognitive model software application 110 is configured to utilize the features shown in FIG. 1 to distinguish the real user 71 from the imposter user 72.

TABLE 1

| Feature Type | Example Features |
| --- | --- |
| Linguistic | character n-gram statistics, phrase structure, usage of suffixes and prefixes, sequence of parts-of-speech in sentences, sentential complexity, grammatical errors, syntactic parse tree |
| Stylometric | usage of function words, usage of high frequency words and phrases, usage of dialect, and usage of sentence and paragraph lengths |
| Topical | key words and phrases, named entities such as person name and location name, and abbreviations |
| Behavioral | how the user use keyboard, short-cut keys and keystroke patterns, Patterns of errors such as spelling errors, punctuation errors and the way the user corrects the errors |
| Contextual | application such as email client, instant messaging, text editor, and/or web browser; Relationship with the recipients of the text; Number of the recipients; Day and time of the text creation |

For active authentication in embodiments, active authentication in the cognitive model software application 110 requires modeling of both the user's typical behaviors and extraction of investigative insights as well. As an example, consider the following email messages sent from Bob's computer 10.

"Please send me the password."
"Please send Alice the password."
"Please send Bob the password."

All three messages sound normal and are very similar in terms of linguistic styles. When the cognitive model software application 110 analyzes these texts against statistical models of Bob, the cognitive model software application 110 may not find anything unusual in these messages.

However, when the cognitive model software application 110 considers using personal attributes of the real user 71 (who is Bob in this example) that people do not usually address themselves by their names, the cognitive model software application 110 is configured to flag the last message as suspicious.

To capture this level of anomaly, the cognitive model software application 110 defines and executes finer-grained feature categories such as usage of pronouns, usage of person names, usage of dialect, patterns of typos, etc., and applies a multi-view learning approach on each of the feature category. The cognitive model software application 110 is configured with advanced text mining algorithms to extract various linguistic features from unstructured text including named entities, abbreviations, and phrases. In particular, the cognitive model software application 110 includes symbolic and statistical machine learning methods such as language models for identifying frequent phrases and syntactic patterns, statistical entity recognition methods for extracting topical key phrases, and probabilistic topic modeling methods for identifying topical interests of the user.

The cognitive model software application 110 then applies an ensemble classifier over the multi-view models. Each component produces the likelihood of the user being correct given the specific features. The meta-classifier takes the results from underlying classifiers, and produces a final probability value.

Further, it is noted that a person's linguistic characteristics change over time, as, for instance, he gains more knowledge on the language and/or becomes a more competent writer. The cognitive model software application 110 may include on-line learning algorithms to continuously update the user model to address the real user's 71 change in linguistic characteristics over time such that the profile 120 is continuously updated.

Figure 10:
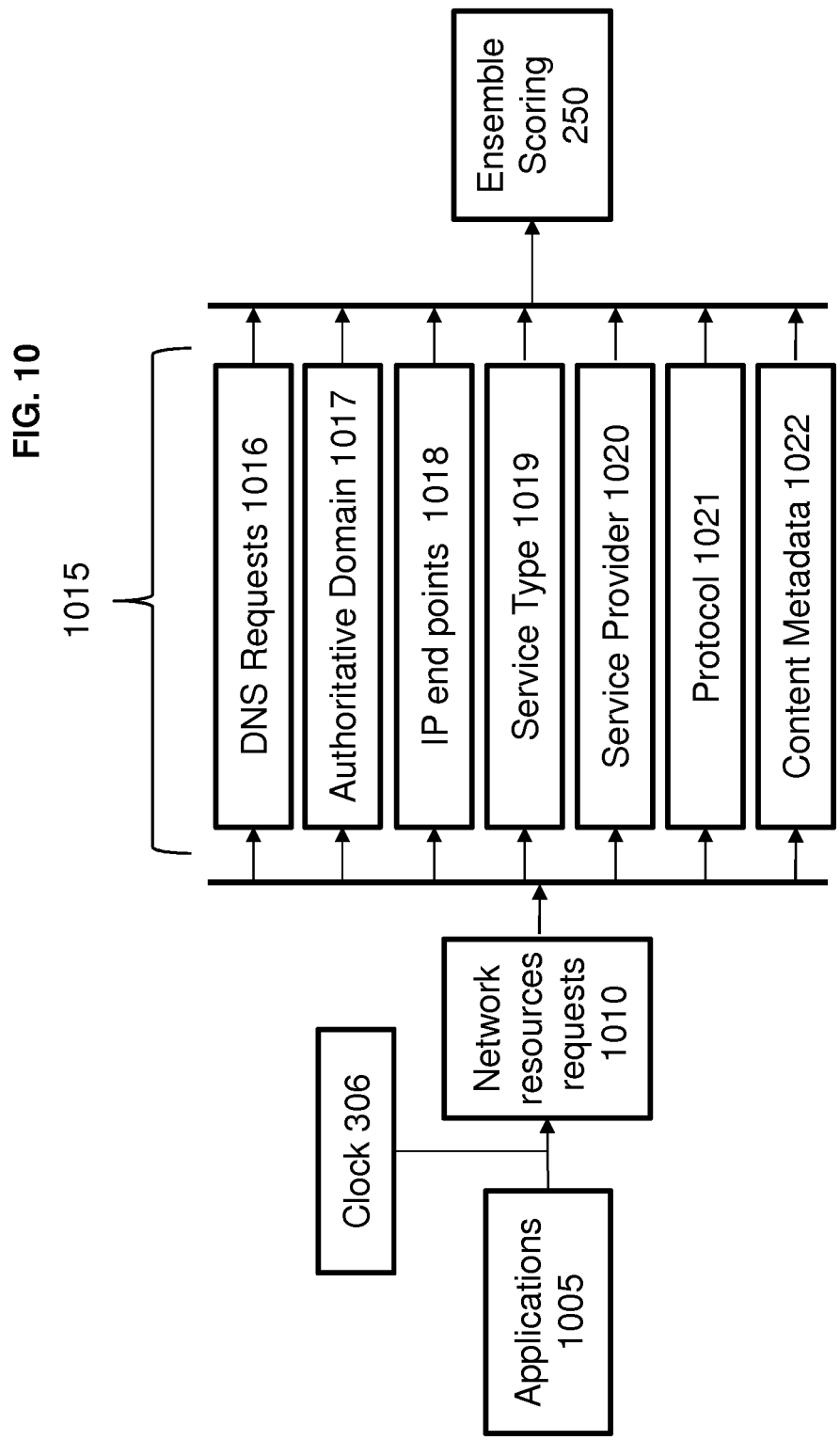
FIG. 10 is a flow chart illustrating further details of the network footprint of user actions biometric modality according to an embodiment.

Turning to the network footprint of use actions more in depth, FIG. 10 is a flow chart 1000 illustrating further details of the network footprint of user actions biometric modality at block 410 according to an embodiment.

The cognitive model software application 110 receives input from the clock 306 and applications 1005. Via the monitoring application 105, the cognitive model software application 110 monitors and analyzes the network resources requests of the applications 1005 at block 1010. The network requests at block 1010 may be to a local newspaper website, to a shopping website such as Amazon™, to a secure online banking website, to the virtual machine 135, etc. The cognitive model software application 110 tracks the various types of network traffic 1015 requested by the real user 71, and the types of network traffic 1015 (along with the lengths of time and data of the back and forth communication) is stored in the profile 120 (to eventually compare against an imposter user's network traffic on computer 10). The network traffic 1015 is communication data between the computer 10 and other computer systems (such as servers and computers 130, and/or virtual machine 135 (on server 20). The monitored and analyzed network traffic 1015 may include domain name system (DNS) requests 1016, authoritative domain 1017, Internet protocol (IP) end points 1018, service type 1019, service provider 1020, protocol 1021, and content metadata 1022.

Based on the network traffic and the time spent on the different types of network traffic 1015, the profile 120 of the real user 71 is built for the network footprint of user actions, and an individual score is generated for the real user 71. The individual score for the network footprint of user actions 410 is combined with the scores of the blocks 405, 415, and 420 to determine (and stored in profile 120) the ensemble score for the real user 71 at block 250.

A scenario is considered in which the user's activities (e.g., the real user 71 on computer 10) directly initiate and/or indirectly trigger many network activities. The cognitive model software application 110 establishes a network fingerprint of a user's interactions with other entities (e.g., computers and servers 130 and virtual machine 135) on the network. These entities include, but are not limited to services/applications, servers, helpers (such as DNS), etc. The network fingerprint (stored in the profile 120) mainly consists of statistical profiles of network features extracted from network activities resulting in network traffic 1015. Using this network fingerprint of the real user 71, the cognitive model software application 110 builds a classifier to estimate the likelihood that observed network activities are from the claimed user, i.e., from the real user 71 instead of the imposter user 72.

Network activities (analyzed by cognitive model software application 110) include web browsing, e-mail, file transfer (ftp, sftp), and remote desktop, which directly initiate network activities. Other network related activities (which may seem to be non-network related activities) are monitored and analyzed by the cognitive model software application 110, and the seemingly non-network related activities, such as editing a file, may indirectly trigger network activities such as accessing the file on a network file/storage server and/or accessing the file on a cloud-based storage service (e.g., server 130). All such network related activities may also trigger DNS queries. Features collected/derived from these network activities can be used to build the profile 120 on how the real user 71 uses and interacts with the network and other entities on the network.

Additionally, the cognitive model software application 110 (integrated with the monitoring (extraction) application 105) collects and/or derive the following sets of features from network activities. The cognitive model software application 110 utilizes these features to answer questions like: who, whom, when, from where, to where, how, how often, etc.

The cognitive model software application 110 collects and analyzes these common temporal (network) features from all network activities (on the computer 10): source/destination ports, protocol, DNS name, time, frequency during different time periods (e.g., browsing activities between 8:30 AM and noon), and duration (e.g., the length of a browsing session with a particular website).

Besides these common temporal features, the cognitive model software application 110 collects and analyzes network features unique to components at the application layer, middleware layer, and network layer, as shown in Table 2. It should be noted that any person skilled in computer networking knows the features in Table 2 are just examples and many other features can be collected and analyzed. Accordingly, the disclosure is not limited to only collect and analyze the features listed in Table 2.

TABLE 2

| Layer | Component | (Network) features |
|---|---|---|
| Application | Web browsing | domain/host/IP address and port number in a URL |
| | Emails | sender/recipient address, subject, size, attachment information: size, MIME type, file names |

TABLE 2-continued

| Layer | Component | (Network) features |
|---|---|---|
| | Remote Login/ File transfer | common network features, metadata on files transferred |
| Middleware | Network/Cloud File Service | service type: NFS, Samba, EC2 cloud, etc. service/provider names |
| | DNS | query types, targets, responses, DNS server IP addresses, names, authoritative domains |
| Network | TCP/UDP | protocol and port numbers |
| | IP | initiating and target machines: IP addresses/subnets, DNS names |

The cognitive model software application 110 may use a social network structure to model the interaction between a user and other network entities, such as a server, an e-mail recipient, etc. For each layer, there is a social network with the user at the center; in the profile 120 by the cognitive model software application 110, an edge linking the user to a network entity, which represents a relationship between the user and the network entity in the social network, is annotated with statistical profiles of temporal features, and the network entity is annotated with the network features. (As understood by one skilled in the art, the disclosure is describing a graph here, where a user and/or other entity is a vertex, and any line connecting them is an edge. In this case, and edge is an association between a user and network resources, as in this user uses that resource.) The statistical profiles on temporal features are created and utilized by the cognitive model software application 110 to determine the likelihood of the user accessing the network entity, such as a web server at a given time, how long the access is expected to last, etc. The temporal profiles (e.g., stored in the profile 120 for the real user 71) can be conditioned on initiating machines and thus tell how likely the user is to use that machine to access the network entity at a given time. A network entity can be further annotated (by the cognitive model software application 110) with the application and/or middleware specific profiles such as statistical profiles on email attachment attributes, attributes of files transferred, etc. Note that the cognitive model software application 110 stores the name/identification of the network entities, applications, network features (activities), etc., and makes annotations to these.

In one case, it is possible two users may generate very similar models. For example, two workers in the same group, with similar training and background, the same job title, and working on the same project are very likely to access the same set of files, go to the same websites, and use the same applications and tools. The topology of their social networks could be almost identical, except with different users at the center. So, it may appear difficult to easily distinguish them using the social network model mentioned. However, the cognitive model software application 110 is configured to make the annotations on the edges and nodes to determine that the two users are not identical. For example, the two users do not access all of the same files or services, and/or login to the same remote machines, at the same time, with the same duration and frequency. Likewise, their profiles on sending and receiving emails are not going to be identical, although they could be communicating with the same group of people. The cognitive model software application 110 utilizes such differences in human behaviors can be used effectively to identify users and detect unusual activities.

There are many possible ways to combine scores for different network features. For example, weights can be assigned to different features and the scores for these features can be combined using a weighted sum approach. More sophisticated approaches such as Bayesian Network or log likelihood are also possible. This disclosure is not limited to any specific way or ways to combine the scores.

Figure 11:
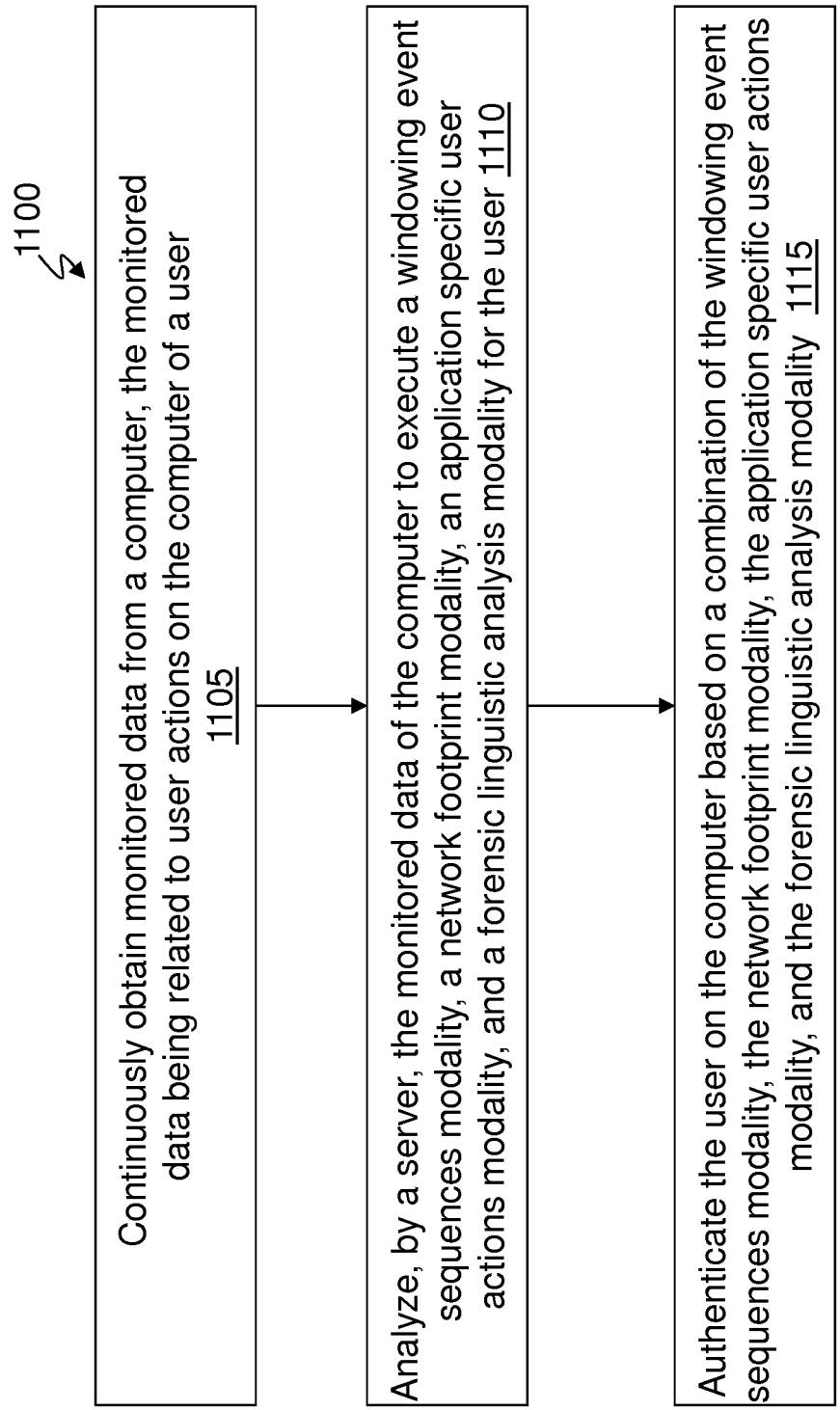
FIG. 11 is a flow chart of a method for continuous user authentication through real-time fusion and correlation of multiple factors according to an embodiment.

FIG. 11 is a flow chart 1100 of a method for continuous user authentication through real-time fusion and correlation of multiple factors according to an embodiment. At block 1105, the cognitive model software application 110 (e.g., executing on the server 20) continuously obtains monitored data from the computer 10 (via the monitoring (extraction) application 105 executing on the computer 10), where the monitored data is of (related to) user actions on the computer of the real user 71.

At block 1110, the cognitive model software application 110 (on the server 20) analyzes the received monitored data of the computer 10 to determine (and execute) the windowing event sequences modality, the network footprint modality, the application specific user actions modality, and the forensic linguistic analysis modality for the user. At block 115, the cognitive model software application 110 (on the server 20) authenticates the present user (as the real user 71) on the computer 10 based on a combination of the windowing event sequences modality, the network footprint modality, the application specific user actions modality, and the forensic linguistic analysis modality.

The windowing event sequences modality is configured to authenticate the user based on user operations in a windowing based operating system on the computer 10. The windowing event sequences modality is configured to categorize behavior of the user in the windowing based operating system on the computer 10. Categorizing (via the windowing event sequences modality) the behavior of the user includes determining content selection strategies, determining application and desktop navigation strategies, determining text editing strategies, and determining context sensitive pop-up menus strategies. To authenticate the user (via the windowing event sequences modality), the widowing event sequence modality applies factors, the factors include window system manipulation which is how the user manipulates windowing system (e.g., graphical user interface type display boxes for interfacing with a software application) on the computer 10, menu access which is how the user accesses menus on the computer, and application launch sequence which is a sequence of operations performed by the user to launch a software application on the computer 10.

The network footprint modality is configured to monitor network activities on the computer 10 to build a network fingerprint of user interactions with other entities on a communications network. The other entities include servers and computers 130. The network activities include web browsing, email, file transfer, and/or remote desktop (activities).

In order to generate a trained model, the application specific user actions modality (i.e., generative models of user actions) is configured to measure what actions the user performs in a particular application and measure how the user invokes each command to perform the actions in the particular application (all of which is for the real user 71). The application specific user actions modality subsequently measures what actions the user performs in the particular application and measures how the user invokes each command to perform the actions in the particular application in order to generate a new model for subsequent measurements for the present user (in which it needs to be determined whether the present user in the real user 71 or the imposter user 72). The application specific user actions modality is configured to authenticate the user (as in fact being the real user 71) by determining that the new model (for the present user) deviates from the trained model (for the real user 71) by less than a predefined amount. The application specific user actions modality factors in the role, task, and expertise of the real user 71.

In order to determine a previous score (of the real user 71) for the forensic linguistic analysis modality, the forensic linguistic analysis modality is configured to combine linguistic features, stylometric features, topical features, behavioral features, and contextual features all performed by the real user 71. The forensic linguistic analysis modality determines a new score (for the present user) by subsequently combining (i.e., for monitored data obtained on a later occasion) the linguistic features, the stylometric features, the topical features, the behavioral features, and the contextual features. Accordingly, the forensic linguistic analysis modality is configured to authenticate the user (as being the real user 71) by determining that the new score (of the present user) deviates from the previous score by less than a predefined amount. The linguistic features comprise character n-gram statistics, phrase structure, usage of suffixes and prefixes, sequence of parts-of-speech in sentences, sentential complexity, grammatical errors, and/or syntactic parse tree. The stylometric features comprise function words, high frequency words and phrases, dialect, and/or sentence and paragraph lengths. The topical features comprise keywords and phrases, named entities (including person name and location name), and/or abbreviations. The behavioral features comprise how the user uses keyboard, short-cut keys, keystroke patterns, and patterns of errors (including spelling errors and punctuation errors), and/or a manner in which the user corrects the errors. The contextual features comprise software applications (including email client, instant messaging, text editor, and web browser), relationship with recipients of email, number of the recipients, and/or day and time of email creation.

Figure 12:
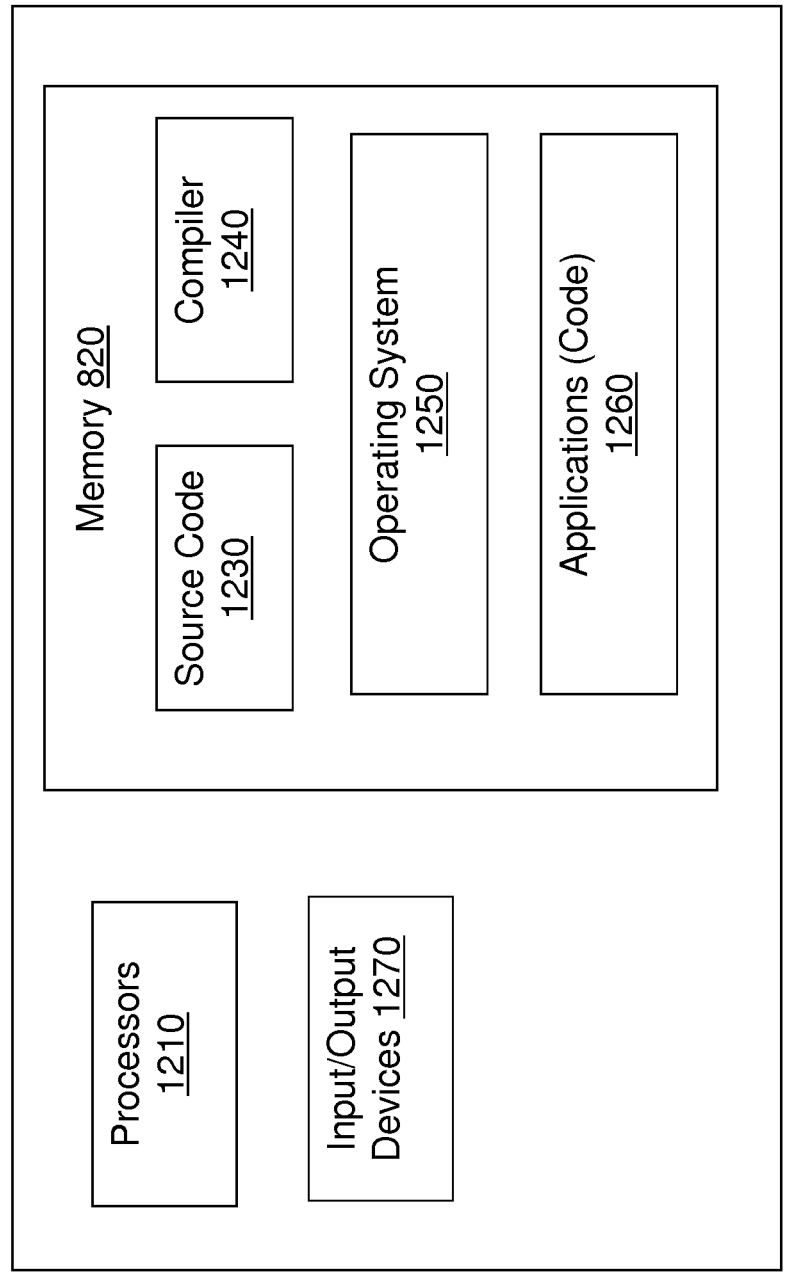
FIG. 12 illustrates an example computer that implements and executes any of the features discussed herein.

FIG. 12 illustrates an example computer 800 that can implement features discussed herein. The computer 1200 may be a distributed computer system over more than one computer. Various methods, procedures, modules, flow diagrams, tools, applications, circuits, elements, and techniques discussed herein may also incorporate and/or utilize the capabilities of the computer 1200. Indeed, capabilities of the computer 1200 may be utilized to implement and execute features of exemplary embodiments, including the computer 10, the server 20, and the servers and computer 130, discussed herein.

Generally, in terms of hardware architecture, the computer 1200 may include one or more processors 1210, computer readable storage memory 1220, and one or more input and/or output (I/O) devices 1270 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1210 is a hardware device for executing software that can be stored in the memory 1220. The processor 1210 can be virtually any custom made or commercially available processor, a central processing unit (CPU), a data signal processor (DSP), or an auxiliary processor among several processors associated with the computer 1200, and the processor 1210 may be a semiconductor based microprocessor (in the form of a microchip) or a macroprocessor.

The computer readable memory 1220 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Note that the memory 1220 can have a distributed architecture, where various components are situated remote from one another, but can be accessed by the processor(s) 1210.

The software in the computer readable memory 1220 may include one or more separate programs, each of which comprises an ordered listing of executable instructions for implementing logical functions. The software in the memory 1220 includes a suitable operating system (O/S) 1250, compiler 1240, source code 1230, and one or more applications 1260 of the exemplary embodiments. As illustrated, the application 1260 comprises numerous functional components for implementing the features, processes, methods, functions, and operations of the exemplary embodiments.

The operating system 1250 may control the execution of other computer programs, and provides scheduling, input-output control, file and data management, memory management, and communication control and related services.

The software application 1260 may be a source program, executable program (object code), script, or any other entity comprising a set of instructions to be performed. When a source program, then the program is usually translated via a compiler (such as the compiler 1240), assembler, interpreter, or the like, which may or may not be included within the memory 1220, so as to operate properly in connection with the O/S 1250. Furthermore, the application 1260 can be written as (a) an object oriented programming language, which has classes of data and methods, or (b) a procedure programming language, which has routines, subroutines, and/or functions.

The I/O devices 1270 may include input devices (or peripherals) such as, for example but not limited to, a mouse, keyboard, scanner, microphone, camera, etc. Furthermore, the I/O devices 1250 may also include output devices (or peripherals), for example but not limited to, a printer, display, etc. Finally, the I/O devices 1270 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1270 also include components for communicating over various networks, such as the Internet or an intranet. The I/O devices 1270 may be connected to and/or communicate with the processor 1210 utilizing Bluetooth connections and cables (via, e.g., Universal Serial Bus (USB) ports, serial ports, parallel ports, FireWire, HDMI (High-Definition Multimedia Interface), etc.).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for continuous user authentication through real-time fusion and correlation of multiple factors, the method comprising:
    continuously obtaining monitored data from a computer, the monitored data being related to user actions on the computer of a user;
    analyzing, by a server, the monitored data of the computer to execute a windowing system event sequences modality, a network footprint modality, an application specific user actions modality, and a forensic linguistic analysis modality for the user;
    authenticating the user on the computer based on a combination score of a first score related to the windowing system event sequences modality, a second score related to the network footprint modality, a third score related to the application specific user actions modality, and a fourth score related to the forensic linguistic analysis modality; and
    in response to an application comprising rote operations in the application specific user actions modality, increasing the first score related to the windowing system event sequences modality;
    wherein the windowing system event sequences modality is configured to authenticate the user based on user operations in a windowing system based operating system on the computer;
    wherein the network footprint modality is configured to monitor network activities on the computer to build a network fingerprint of user interactions with other entities on a communications network;
    wherein the application specific user actions modality is configured to track what actions the user performs in a particular application and track how the user invokes each command to perform the actions in the particular application, in order to generate a trained model; and
    wherein the forensic linguistic analysis modality is configured to combine two or more of linguistic features, stylometric features, topical features, behavioral features, and contextual features all performed by the user, in order to determine a previous score for the forensic linguistic analysis modality.

2. The method of claim 1,
    wherein the first score, the second score, and the third score are combined via an aggregation function.

3. The method of claim 2, wherein the windowing system event sequences modality is configured to categorize behavior of the user in the windowing system based operating system on the computer; and
    wherein categorizing the behavior of the user includes determining content selection strategies, determining application and desktop navigation strategies, determining text editing strategies, and determining context sensitive pop-up menus strategies.

4. The method of claim 2, wherein to authenticate the user, the windowing system event sequence modality applies factors, the factors include window manipulation which is how the user manipulates windowing system on the computer, menu access which is how the user accesses menus on the computer, and application launch sequence which is a sequence of operations performed by the user to launch an application on the computer.

5. The method of claim 1, wherein other entities include servers and computers.

6. The method claim 5, wherein the network activities include at least one of web browsing, email, file transfer, and remote desktop.

7. The method of claim 1,
    wherein the application specific user actions modality subsequently tracks what actions the user performs in the particular application and tracks how the user invokes each command to perform the actions in the particular application in order to generate a new model for subsequent measurements; and
    wherein the application specific user actions modality is configured to authenticate the user by determining that the new model deviates from the trained model by less than a predefined amount.

8. The method of claim 7, wherein the application specific user actions modality factors in a role, a task, and an expertise of the user.

9. The method of claim 1
    wherein the forensic linguistic analysis modality determines a new score by subsequently combining at least two or more of the linguistic features, the stylometric features, the topical features, the behavioral features, and the contextual features; and
    wherein the forensic linguistic analysis modality is configured to authenticate the user by determining that the new score deviates from the previous score by less than a predefined amount.

10. The method of claim 9, wherein the linguistic features comprise character n-gram statistics, phrase structure, usage of suffixes and prefixes, sequence of parts-of-speech in sentences, sentential complexity, grammatical errors, and syntactic parse tree;
    wherein the stylometric features comprise at least one of usage of function words, high frequency words and phrases, dialect, and sentence and paragraph lengths;
    wherein the topical features comprise at least one of keywords and phrases, named entities including person name and location name, and abbreviations;
    wherein the behavioral features comprise at least one of how the user uses keyboard, short-cut keys, keystroke patterns, and patterns of errors including spelling errors and punctuation errors, and a manner in which the user corrects the errors; and wherein the contextual features comprise at least one of applications including email client, instant messaging, text editor, and web browser, relationship with recipients of email, number of the recipients, and day and time of email creation.

11. A computer program product for continuous user authentication through real-time fusion and correlation of multiple factors, the computer program product comprising a computer readable storage device having program instructions embodied therewith, the program instructions executable by a server to cause the server to perform a method comprising:

continuously obtaining monitored data from a computer, the monitored data being related to user actions on the computer of a user;

analyzing, by the server, the monitored data of the computer to execute a windowing system event sequences modality, a network footprint modality, an application specific user actions modality, and a forensic linguistic analysis modality for the user;

authenticating the user on the computer based on a combination score of a first score related to the windowing system event sequences modality, a second score related to the network footprint modality, a third score related to the application specific user actions modality, and a fourth score related to the forensic linguistic analysis modality; and in response to an application comprising rote operations in the application specific user actions modality, increasing the first score related to the windowing system event sequences modality;

wherein the windowing system event sequences modality is configured to authenticate the user based on user operations in a windowing system based operating system on the computer;

wherein the network footprint modality is configured to monitor network activities on the computer to build a network fingerprint of user interactions with other entities on a communications network;

wherein the application specific user actions modality is configured to track what actions the user performs in a particular application and track how the user invokes each command to perform the actions in the particular application, in order to generate a trained model; and wherein the forensic linguistic analysis modality is configured to combine two or more of linguistic features, stylometric features, topical features, behavioral features, and contextual features all performed by the user, in order to determine a previous score for the forensic linguistic analysis modality.

12. The computer program product of claim 11, wherein the windowing system event sequences modality is configured to categorize behavior of the user in the windowing system based operating system on the computer; and wherein categorizing the behavior of the user includes determining at least one of content selection strategies, determining application and desktop navigation strategies, determining text editing strategies, and determining context sensitive pop-up menus strategies.

13. The computer program product of claim 11, wherein to authenticate the user, the windowing system event sequence modality applies factors, the factors include window manipulation which is how the user manipulates the windowing system on the computer, menu access which is how the user accesses menus on the computer, and application launch sequence which is a sequence of operations performed by the user to launch an application on the computer.

14. The computer program product of claim 11, wherein other entities include servers and computers.

15. The computer program product claim 14, wherein the network activities include at least one of web browsing, email, file transfer, and remote desktop.

16. The computer program product of claim 11, wherein the application specific user actions modality subsequently tracks what actions the user performs in the particular application and tracks how the user invokes each command to perform the actions in the particular application in order to generate a new model for subsequent measurements; and wherein the application specific user actions modality is configured to authenticate the user by determining that the new model deviates from the trained model by less than a predefined amount.

17. The computer program product of claim 16, wherein the application specific user actions modality factors in a role, a task, and an expertise of the user.

18. The computer program product of claim 11, wherein the forensic linguistic analysis modality determines a new score by subsequently combining two or more of the linguistic features, the stylometric features, the topical features, the behavioral features, and the contextual features; and wherein the forensic linguistic analysis modality is configured to authenticate the user by determining that the new score deviates from the previous score by less than a predefined amount.

19. An apparatus for continuous user authentication through real-time fusion and correlation of multiple factors, the apparatus comprising:

a processor; and memory comprising computer-executable instructions that, when executed by the processor, cause the processor to perform operations comprising:

continuously obtaining monitored data from a computer, the monitored data being related to user actions on the computer of a user;

analyzing, by the processor, the monitored data of the computer to execute a windowing system event sequences modality, a network footprint modality, an application specific user actions modality, and a forensic linguistic analysis modality for the user;

authenticating the user on the computer based on a combination score of a first score related to the windowing system event sequences modality, a second score related to the network footprint modality, a third score related to the application specific user actions modality, and a fourth score related to the forensic linguistic analysis modality; and in response to an application comprising rote operations in the application specific user actions modality, increasing the first score related to the windowing system event sequences modality;

wherein the windowing system event sequences modality is configured to authenticate the user based on user operations in a windowing system based operating system on the computer;

wherein the network footprint modality is configured to monitor network activities on the computer to build a network fingerprint of user interactions with other entities on a communications network;

wherein the application specific user actions modality is configured to track what actions the user performs in a particular application and track how the user invokes each command to perform the actions in the particular application, in order to generate a trained model; and wherein the forensic linguistic analysis modality is configured to combine two or more of linguistic features, stylometric features, topical features, behavioral features, and contextual features all performed by the user, in order to determine a previous score for the forensic linguistic analysis modality.

* * * * *